(12) United States Patent
Kanematsu et al.

(10) Patent No.: US 7,936,498 B2
(45) Date of Patent: May 3, 2011

(54) DISPLAY ELEMENT, IMAGE DISPLAY DEVICE, AND IMAGE DISPLAY SYSTEM

(75) Inventors: Toshihiro Kanematsu, Kanagawa (JP); Masaru Ohgaki, Kanagawa (JP); Shinji Aoki, Kanagawa (JP); Hisayoshi Ohshima, Kanagawa (JP); Shinya Seno, Kanagawa (JP); Masahiro Masuzawa, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 12/376,843

(22) PCT Filed: Mar. 5, 2008

(86) PCT No.: PCT/JP2008/054442
§ 371 (c)(1),
(2), (4) Date: Feb. 9, 2009

(87) PCT Pub. No.: WO2008/111596
PCT Pub. Date: Sep. 18, 2008

(65) Prior Publication Data
US 2010/0188731 A1    Jul. 29, 2010

(30) Foreign Application Priority Data

Mar. 8, 2007 (JP) ................. 2007-059114
Mar. 8, 2007 (JP) ................. 2007-059115

(51) Int. Cl.
*G02B 7/02* (2006.01)
(52) U.S. Cl. ...................... 359/296; 359/290

(58) Field of Classification Search .............. 359/296, 359/237, 238, 242, 253; 204/450, 600
See application file for complete search history.

(56) References Cited

U.S. PATENT DOCUMENTS

| | | |
|---|---|---|
| 6,930,818 B1 | 8/2005 | Liang et al. |
| 7,572,491 B2 * | 8/2009 | Wang et al. ............. 428/1.5 |
| 7,575,845 B2 * | 8/2009 | Kobayashi et al. ....... 430/270.1 |
| 2004/0184136 A1 * | 9/2004 | Goden ................. 359/296 |
| 2004/0219306 A1 | 11/2004 | Wang et al. |
| 2005/0133154 A1 | 6/2005 | Daniel et al. |
| 2005/0231795 A1 | 10/2005 | Martins et al. |
| 2006/0139724 A1 | 6/2006 | Liang et al. |
| 2007/0036919 A1 | 2/2007 | Wang et al. |
| 2007/0286986 A1 | 12/2007 | Daniel et al. |

(Continued)

FOREIGN PATENT DOCUMENTS

EP    1544668 A1    6/2005

(Continued)

OTHER PUBLICATIONS

Dec. 22, 2010 European search report in connection with counterpart European patent application No. 08721858.

*Primary Examiner* — Timothy J Thompson
(74) *Attorney, Agent, or Firm* — Cooper & Dunham LLP

(57) ABSTRACT

A display element includes a hollow structure. The hollow structure includes plural cells disposed in a plane, each having an opening in a first wall of the hollow structure, and a partition wall separating the adjacent cells. A solvent having one or more types of white particles and/or colored particles dispersed therein is disposed in the cells. The openings are sealed with a resin insoluble in the solvent. A thickness of the partition wall separating the adjacent cells is 0.01 μm or greater but not greater than 10 μm.

20 Claims, 24 Drawing Sheets

U.S. PATENT DOCUMENTS

2008/0220204 A1    9/2008    Ohgaki et al.

FOREIGN PATENT DOCUMENTS

| | | |
|---|---|---|
| EP | 1967342 A1 | 3/2008 |
| JP | 2000-352728 | 12/2000 |
| JP | 2001-315217 | 11/2001 |
| JP | 3680996 | 5/2005 |
| JP | 2005-148680 | 6/2005 |
| JP | 2005-292789 | 10/2005 |
| JP | 2005-538424 | 12/2005 |
| JP | 2006-517038 | 7/2006 |
| JP | 2007-98930 | 4/2007 |
| WO | 02/01281 A2 | 1/2002 |

\* cited by examiner

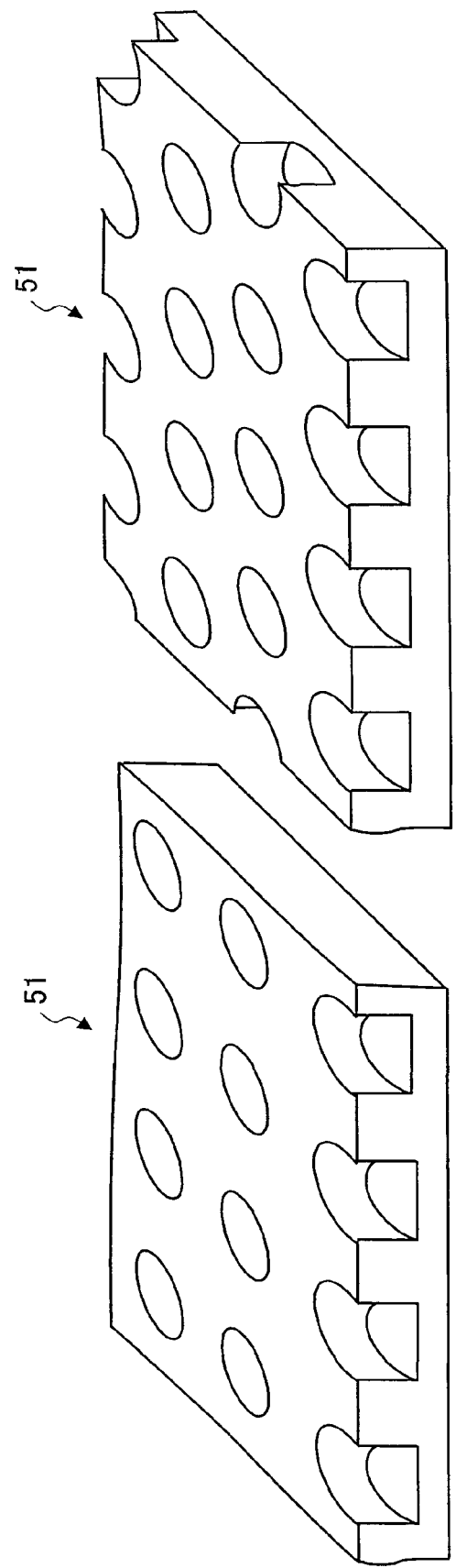

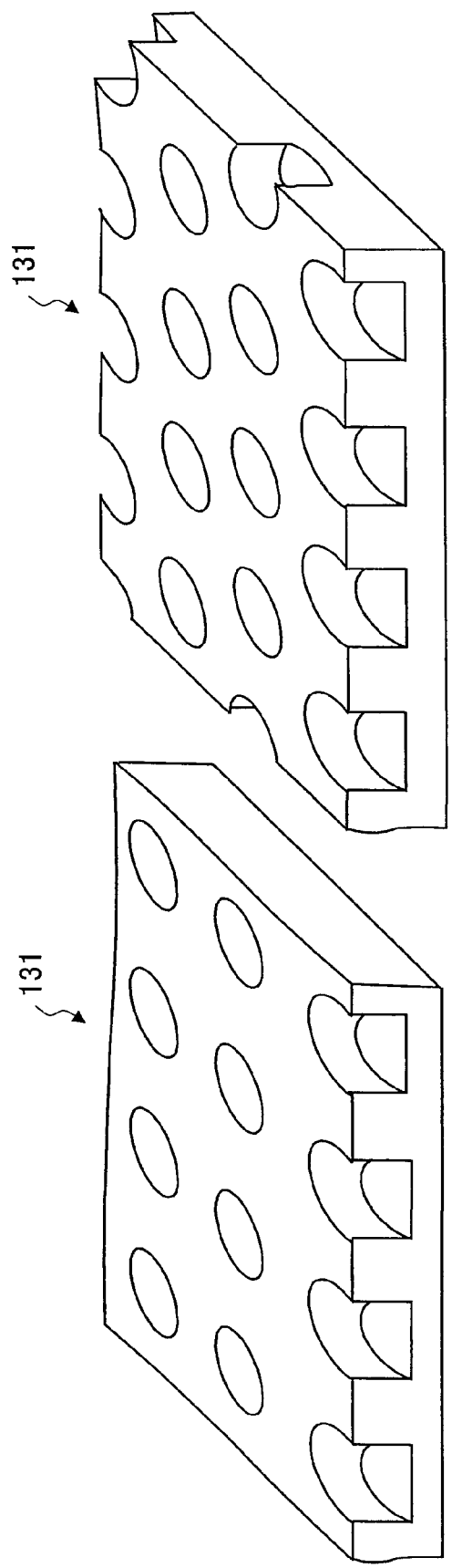

DISPLAY ELEMENT, IMAGE DISPLAY DEVICE, AND IMAGE DISPLAY SYSTEM

CROSS REFERENCE TO RELATED APPLICATIONS

This application is a national stage filing of PCT/JP2008/054442 filed on Mar. 5, 2008, claiming benefit of priority of the Japanese Patent Application No. 2007-059114 filed on Mar. 8, 2007 and benefit of priority of the Japanese Patent Application No. 2007-059115 filed on Mar. 8, 2007.

TECHNICAL FIELD

This disclosure relates to a display element, an image display device, and an image display system.

BACKGROUND ART

An electrophoresis display is a non-emissive device based on the electrophoresis phenomenon of charged pigment particles suspended in a solvent. The electrophoresis display usually comprises two plates with electrodes placed opposing each other, separated by using spacers. One of the electrodes is usually transparent. A suspension is enclosed between the two plates. When a voltage difference is imposed between the two electrodes, the pigment particles migrate to one side and then either the color of the pigment or the color of the solvent can be seen according to the polarity of the voltage difference.

PCT International Publication No. WO/2001/067170 discloses an electrophoresis display that includes plural cup-like indentations (cells) created by microembossing or imagewise exposure. The cells are filled with dispersions, which are charged pigment particles, in a dielectric solvent or solvent mixture. A polymer sealing film for sealing the cells filled with the dispersions is formed by curing a sealing composition on top of the dispersions, which sealing composition has a specific gravity lower than the dispersions and is at least partially immiscible with the dispersions.

A problem with this electrophoresis display is that, because microembossing or imagewise exposure is used for creating the cells, it is difficult to reduce the thickness of the cell wall separating the adjacent cells. The thickness of the cell wall affects display properties. The thicker the cell wall, the smaller the display area, resulting in reduced display properties such as lower reflectance and contrast.

The use of microembossing or imagewise exposure for creating the cells also makes it difficult to reduce the thickness of bottom walls of the cells. In the case of microembossing, the cells are formed by embossing a film with a mold and transferring the shape of the mold. The lower limit of the film thickness with this technique is about 100 μm. Accordingly, it is difficult to create cells with a bottom wall thickness of 10 μm or less. In the case of imagewise exposure, the cells are formed in a resist layer deposited on a film, by which film the bottom wall thickness of the cells is defined. With this technique, it is difficult to handle a film with a thickness of 10 μm or less. Accordingly, it is difficult to create cells with a bottom wall thickness of 10 μm or less. It is therefore impossible to reduce a drive voltage required for driving the charged pigment particles filling the cells. In the case where the bottom walls of the cells are used as a display surface, the reflectance is low.

Furthermore, if the thickness of the cell wall separating the adjacent cells and the thickness of the bottom walls of the cells are reduced, the strength against warping and bending is reduced.

It is necessary to seal the cells filled with charged pigment particles with the polymer sealing film in order to prevent the dielectric solvent from being dried. The greater the thickness of the polymer sealing film, the lower the reflectance, resulting in requiring high drive voltage.

BRIEF SUMMARY

In an aspect of this disclosure, there are provided a display element having high reflectance, an image display device having the display element, and the image display system having the image display device.

In an aspect of this disclosure, there is provided a display element that includes a hollow structure including plural cells disposed in a plane, each having an opening in a first wall of the hollow structure, and a partition wall separating the adjacent cells. A solvent having one or more types of white particles and/or colored particles dispersed therein is disposed in the cells. The openings are sealed with a resin insoluble in the solvent. A thickness of the partition wall separating the adjacent cells is 0.01 μm or greater but not greater than 10 μm. With this configuration, the display element can provide increased reflectance and improved contrast.

In another aspect, there is provided a display element that includes a hollow structure including plural cells disposed in a plane, each having an opening in a first wall of the hollow structure, and a partition wall separating the adjacent cells. A solvent having one or more types of white particles and/or colored particles dispersed therein is disposed in the cells. The openings are sealed with a resin insoluble in the solvent. A thickness of the first wall and a second wall, opposite to the first wall, is 0.01 μm or greater but not greater than 10 μm. With this configuration, the display element can provide increased reflectance and allow reduction of the required drive voltage.

In another aspect, there is provided a display element that includes a hollow structure including plural cells disposed in a plane, each having an opening in a first wall of the hollow structure, and a partition wall separating the adjacent cells. A solvent having one or more types of white particles and/or colored particles dispersed therein is disposed in the cells. The openings are sealed with a resin insoluble in the solvent. A first joint portion of the first wall with the partition wall and a second joint portion of a second wall, opposite to the first wall, with the partition wall have curved cross-sectional shapes, a curvature radius of each of which is 0.1 μm or greater but not greater than 50 μm. With this configuration, the display element can provide increased reflectance and enhanced strength against warping and bending.

In another aspect, there is provided a display element that includes a hollow structure including plural cells disposed in a plane, each having an opening in a first wall of the hollow structure, and a partition wall separating the adjacent cells. A solvent having one or more types of white particles and/or colored particles dispersed therein is disposed in the cells. The openings are sealed with a resin insoluble in the solvent. The resin is a film, a thickness of which is 0.1 μm or greater but not greater than 10 μm. With this configuration, the display element can provide increased reflectance and allow reduction of the required drive voltage.

In another aspect, there is provided an image display device that includes one of the above-described display elements and a unit that applies a voltage to the display element. With this configuration, the image display device can provide improved display properties or enhanced durability.

In another aspect, there is provided an image display system that includes the above-described image display device.

With this configuration, the image display system can provide improved display properties or enhanced durability.

Accordingly, it is possible to provide a display element having increased reflectance, an image display device having the display element, and an image display system having the image display device.

BRIEF DESCRIPTION OF THE DRAWINGS

FIGS. 8A and 8B are diagrams each illustrating a substrate used by the hollow structure manufacturing method of FIGS. 7A-7D;

FIGS. 14A and 14B are diagrams each illustrating a substrate used by the hollow structure manufacturing method of FIGS. 13A-13D;

BEST MODE FOR CARRYING OUT THE INVENTION

Preferred embodiments of the present invention are described below with reference to accompanying drawings.

According to a first embodiment of the present invention, a display element comprises a hollow structure. The hollow structure includes plural cells disposed in a plane, each having an opening in a first wall of the hollow structure; and a partition wall separating the adjacent cells. A solvent having one or more types of white particles and/or colored particles dispersed therein is disposed in the cells. The openings are sealed with a resin insoluble in the solvent. The display element of the first embodiment has at least one of the following characteristics (1)-(4).

(1) The thickness of the partition wall (hereinafter referred to also as a cell wall) separating the adjacent cells is in the range of 0.01-10 μm, and preferably in the range of 0.05-5 μm.

(2) The thickness of each of the first wall and a second wall, opposite to the first wall, of the hollow structure is in the range of 0.01-10 μm, and preferably in the range of 0.05-5 μm.

(3) A first joint portion of the first wall with the cell wall and a second joint portion of the second wall with the cell wall have curved cross-sectional shapes, a curvature radius of each of which is in the range of 0.1-50 μm, and preferably in the range of 1-10 μm.

(4) The resin with which the openings are sealed is a film, the thickness of which is in the range of 0.1-10 μm, and preferably in the range of 0.5-5 μm.

The thicknesses and curvature radii are average values, each obtained by measuring ten or more arbitrary portions. The measurement can be done by scanning the cross section of the display element or the hollow structure using a scanning electron microscope or other suitable device.

Figure 1:
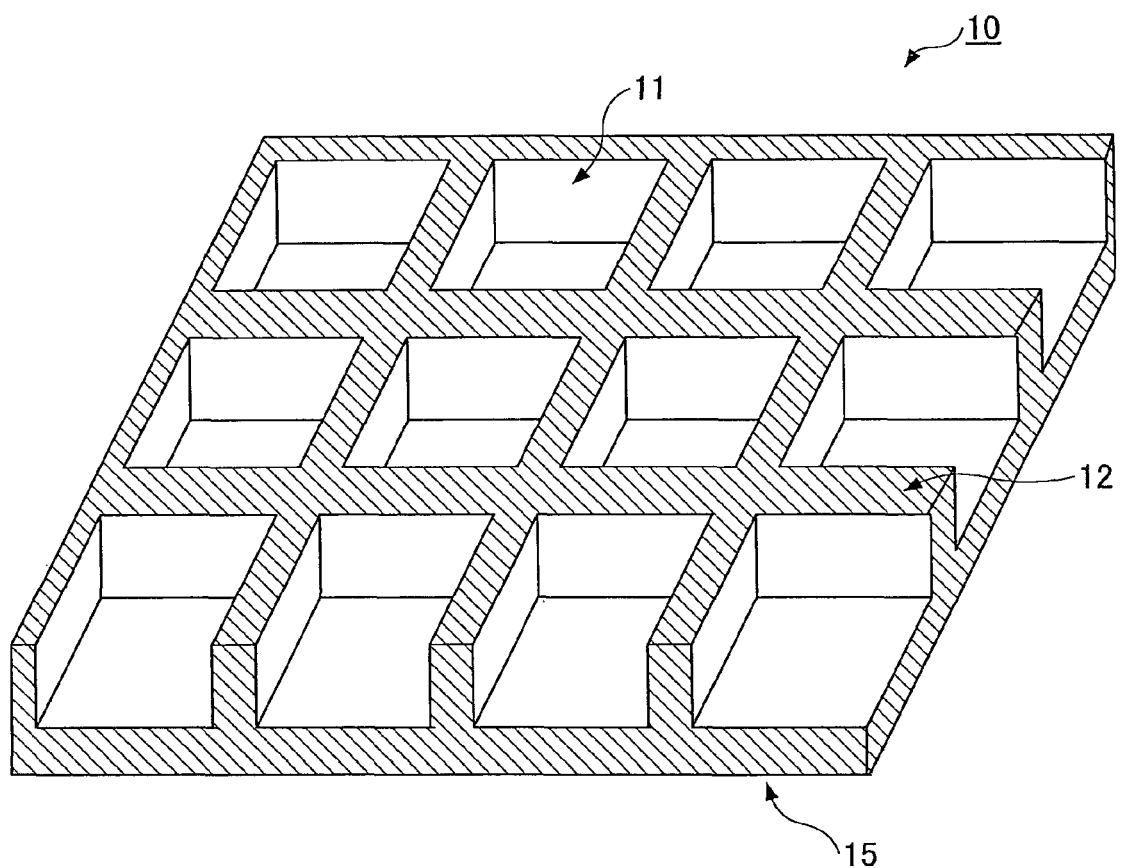
FIG. 1 is a diagram illustrating an example of a hollow structure that may be used in a first embodiment of the present invention.
Figure 2:
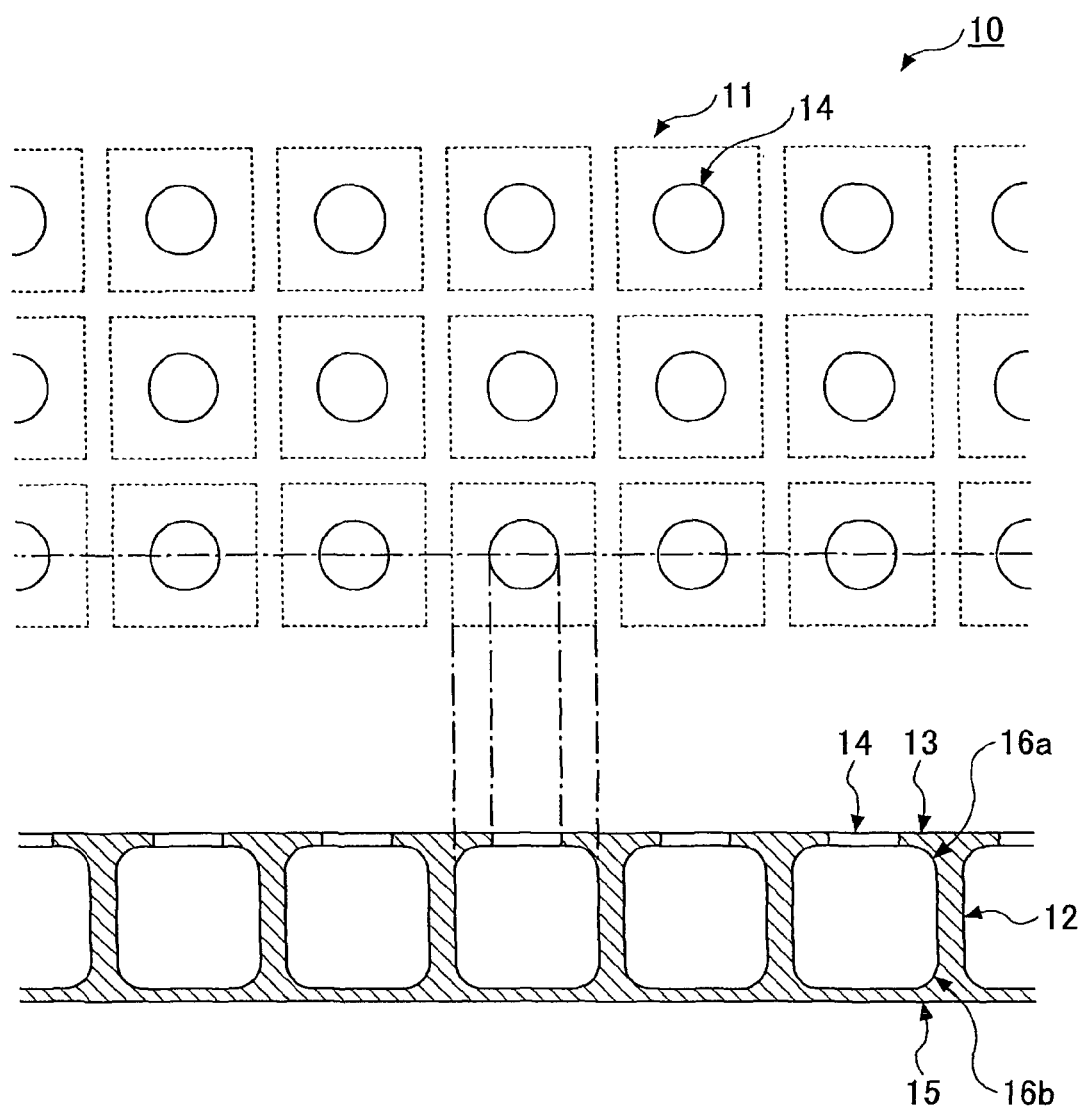
FIG. 2 is a pair of views illustrating the hollow structure of FIG. 1, the upper view being a plan view and the lower view being a cross-sectional view.

FIG. 1 illustrates a hollow structure 10 that may be used in the first embodiment of the present invention. The hollow structure 10 includes plural square-prism-shaped cells 11 disposed in a plane. The adjacent cells 11 are separated from each other by a cell wall 12. As shown in FIG. 2, each cell 11 has an opening 14 in an upper wall 13 of the hollow structure 10. A joint portion 16a of the upper wall 13 with the cell wall 12 and a joint portion 16b of a lower wall 15 with the cell wall 12 have curved cross-sectional shapes. It is to be noted that, in the case where the joint portion 16a has a curved cross-sectional shape, the cell wall 12 defines the area excluding the curved region, i.e., the region below the curved region, while the upper wall 13 defines the region above the cell wall 12. Further, in the case where the joint portion 16b has a curved cross-sectional shape, the cell wall 12 defines the region excluding the curved region, i.e., the region above the curved region, while the lower wall 15 defines the region below the cell wall 12.

Figure 3:
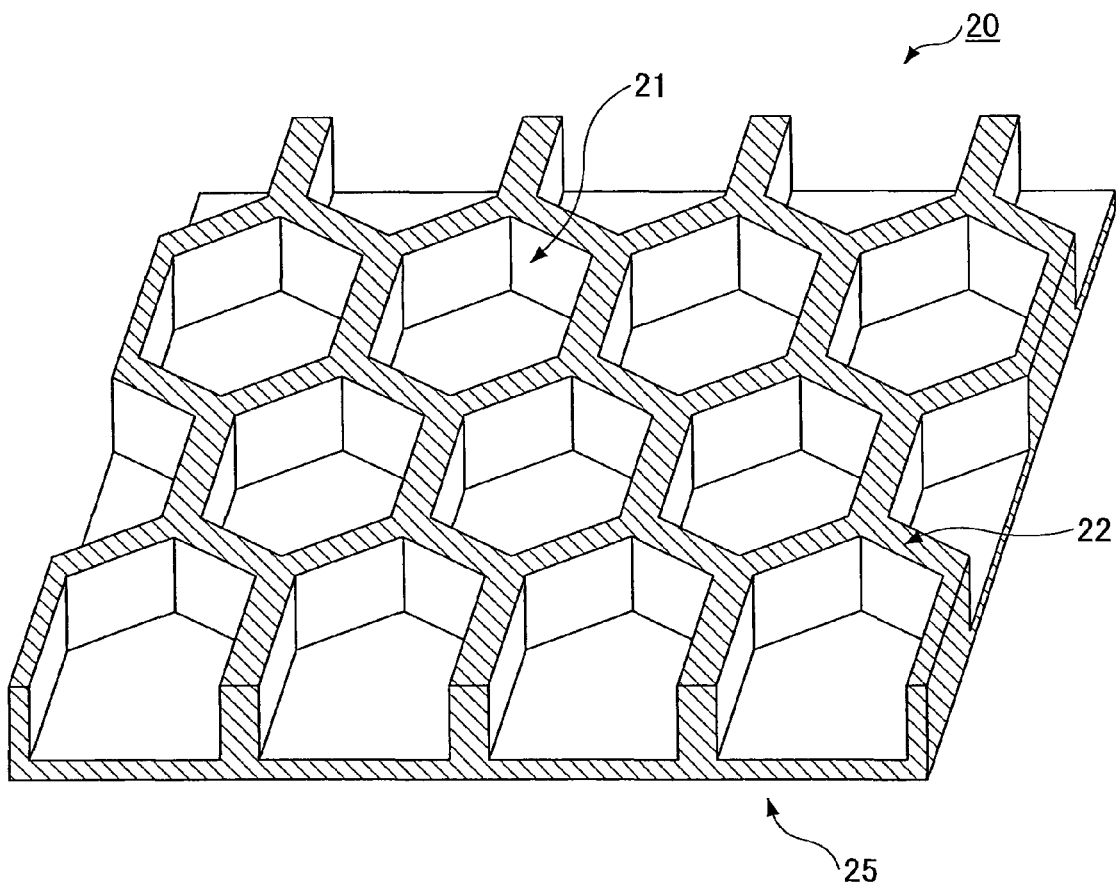
FIG. 3 is a diagram illustrating another example of a hollow structure that may be used in the first embodiment of the present invention.
Figure 4:
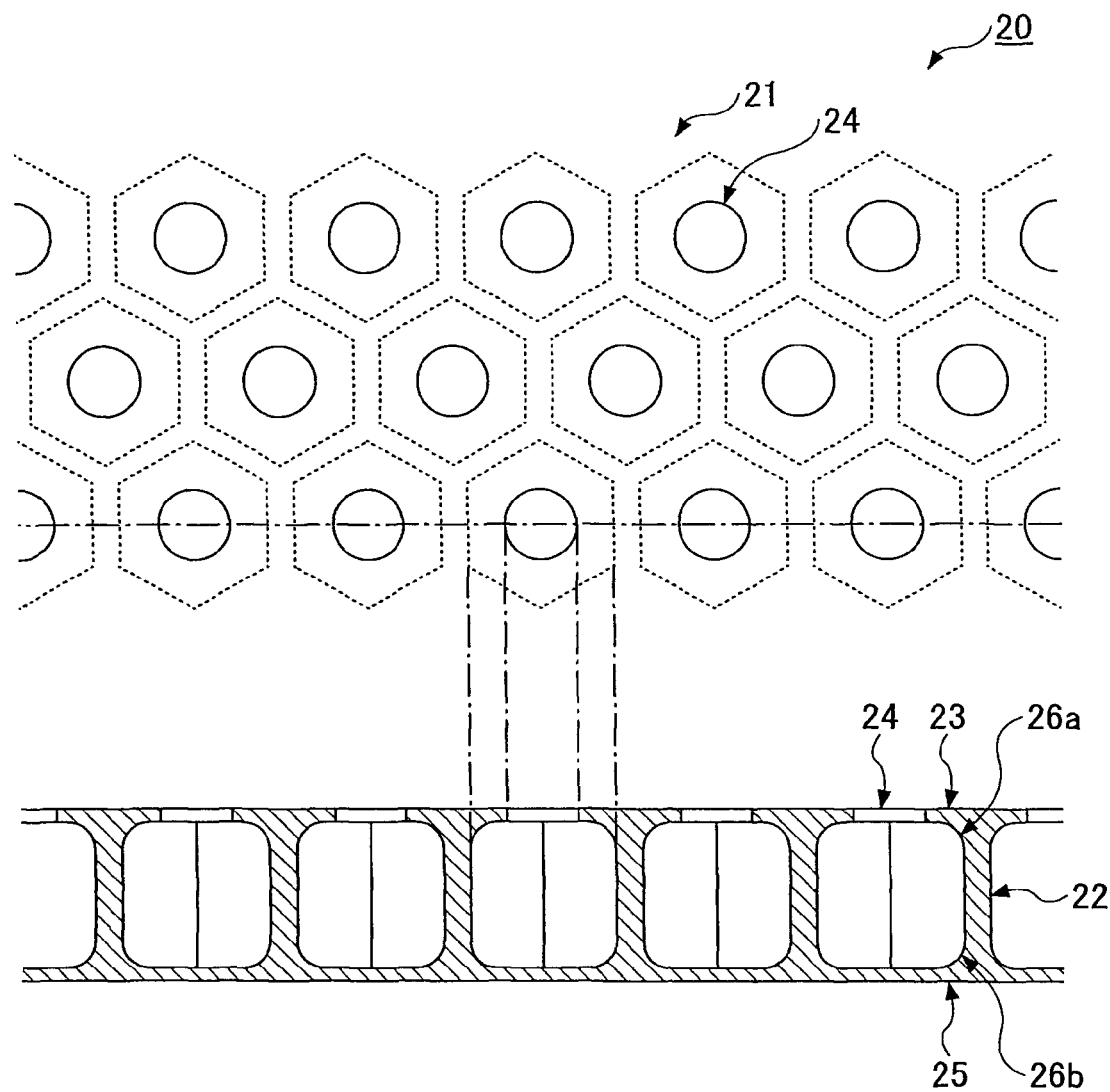
FIG. 4 is a pair of views illustrating the hollow structure of FIG. 3, the upper view being a plan view and the lower view being a cross-sectional view.

FIG. 3 illustrates another hollow structure 20 according to the first embodiment of the present invention. The hollow structure 20 includes plural hexagonal-prism-shaped cells 21 disposed in a plane. The adjacent cells 21 are separated from each other by a cell wall 22. As shown in FIG. 4, each cell 21 has an opening 24 in an upper wall 23 of the hollow structure 20. A joint portion 26a of the upper wall 23 with the cell wall 22 and a joint portion 26b of a lower wall 25 with the cell wall 22 have curved cross-sectional shapes.

A hollow structure that may be used in the first embodiment of the present invention is not limited to the hollow structure 10 of FIG. 1 and the hollow structure 20 of FIG. 3. For example, the cells may be of different sizes. Further, the joint portions may not have curved cross-sectional shapes.

A display element having the characteristic (1) is described below with reference to the hollow structure 20 (a sheet having a honeycomb structure) of FIG. 3. The thickness of the cell wall 22 of the hollow structure 20 is in the range of 0.01-10 μm, and preferably in the range of 0.05-5 μm. With this configuration, the display element including the hollow structure 20 can provide improved display properties. This is because reducing the thickness of the cell wall 22, which does not have a display function, improves reflectance and contrast. If the thickness of the cell wall 22 is less than 0.01 μm, the strength of the hollow structure 20 is reduced. If the thickness of the cell wall 22 is greater than 10 μm, the properties of the display element are reduced in terms of reflectance and contrast.

A display element having the characteristic (2) is described below with reference to the hollow structure 20 (a sheet having a honeycomb structure) of FIG. 3. The thickness of each of the upper wall 23 and the lower wall 25 of the hollow structure is in the range of 0.01-10 μm, and preferably in the range of 0.05-5 μm. With this configuration, the display element including the hollow structure 20 can provide improved display properties. The upper wall 23 and the lower wall 25 with such reduced thicknesses provide advantageous effects in terms of reflectance and drive voltage. If the thickness of the upper wall 23 and the lower wall 25 is less than 0.01 μm, the strength of the hollow structure 20 is reduced. If the thickness is greater than 10 μm, the properties of the display element are reduced in terms of reflectance and drive voltage.

A display element having the characteristic (3) is described below with reference to the hollow structure 20 (a sheet having a honeycomb structure) of FIG. 3. In the hollow structure 20, the joint portion 26a and the joint portion 26b have curved cross-sectional shapes, a curvature radius of each of which is in the range of 0.1-50 μm, and preferably in the range of 1-10 μm. With this configuration, the display element including the hollow structure 20 can provide improved display properties and strength. Thus, the display element can exhibit sufficient strength even when bent for use. That is, the provision of the joint portions 26a and 26b having a greater thickness than the cell wall 22 can improve the strength of the display element. If the curvature radius is less than 0.1 μm, the strength of the display element is sufficient to tolerate being slightly bent, but not sufficient to tolerate being rolled up. If the curvature radius is greater than 50 μm, the display properties are reduced, especially in terms of reflectance.

A display element having the characteristic (4) is described below with reference to the hollow structure 20 (a sheet having a honeycomb structure) of FIG. 3. In the hollow structure 20, a solvent having one or more types of white particles/colored particles dispersed therein is disposed in the cells 21. The openings 24 of the cells 21 are sealed with a resin insoluble in the solvent. The resin with which the openings 24 are sealed is a film, the thickness of which is in the range of 0.1-10 μm, and preferably in the range of 0.5-5 μm. With this configuration, the display element including the hollow structure 20 can provide improved display properties and strength. The resin film with such a reduced thickness provides advantageous effects in terms of reflectance and drive voltage. If the film thickness is less than 0.1 μm, the strength of the hollow structure 20 is reduced. If the film thickness is greater than 10 μm, the properties of the display element are reduced in terms of reflectance and drive voltage.

According to a second embodiment of the present invention, a display element comprises a hollow structure. The hollow structure includes plural cells disposed in a plane, each having a first opening and a second opening respectively in a first wall and a second wall, opposite to the first wall, of the hollow structure; and a partition wall separating the adjacent cells. A solvent having one or more types of white particles and/or colored particles dispersed therein is disposed in the cells. The first openings in the first wall are sealed with a resin insoluble in the solvent. The display element of the second embodiment has at least one of the following characteristics (5)-(8).

(5) The thickness of the partition wall (cell wall) separating the adjacent cells is in the range of 0.01-10 μm, and preferably in the range of 0.05-5 μm.

(6) The thickness of each of the first wall and the second wall of the hollow structure is in the range of 0.01-10 μm, and preferably in the range of 0.05-5 μm.

(7) A first joint portion of the first wall with the cell wall and a second joint portion of the second wall with the cell wall have curved cross-sectional shapes, a curvature radius of each of which is in the range of 0.1-50 μm, and preferably in the range of 1-10 μm.

(8) The resin with which the first openings are sealed is a film, the thickness of which is in the range of 0.1-10 μm, and preferably in the range of 0.5-5 μm.

Figure 5:
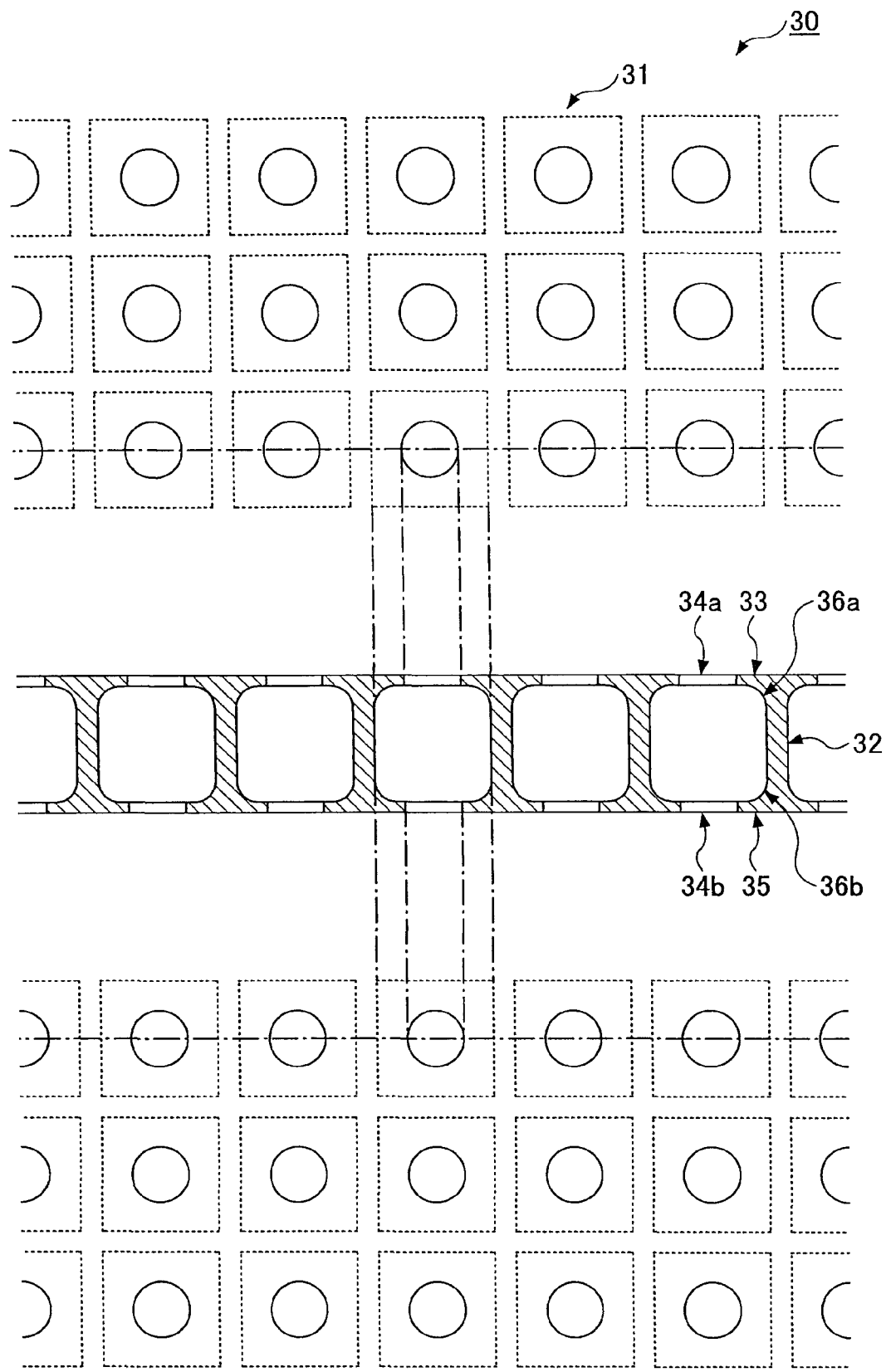
FIG. 5 is a group of views illustrating an example of a hollow structure that may be used in a second embodiment of the present invention, the upper view being a plan view, the middle view being a cross-sectional view, and the lower view being a bottom view.

FIG. 5 illustrates a hollow structure 30 that may be used in the second embodiment of the present invention. The hollow structure 30 includes plural square-prism-shaped cells 31 disposed in a plane. The adjacent cells 31 are separated from each other by a cell wall 32. Each cell 31 has an opening 34a and an opening 34b in an upper wall 33 and a lower wall 35, respectively, of the hollow structure 30. A joint portion 36a of the upper wall 33 with the cell wall 32 and a joint portion 36b of the lower wall 35 with the cell wall 32 have curved cross-sectional shapes. It is to be noted that, in the case where the joint portion 36a has a curved cross-sectional shape, the cell wall 32 defines the area excluding the curved region, i.e., the region below the curved region, while the upper wall 33 defines the region above the cell wall 32. Further, in the case where the joint portion 36b has a curved cross-sectional shape, the cell wall 32 defines the region above the curved region, while the lower wall 35 defines the region below the cell wall 32.

Figure 6:
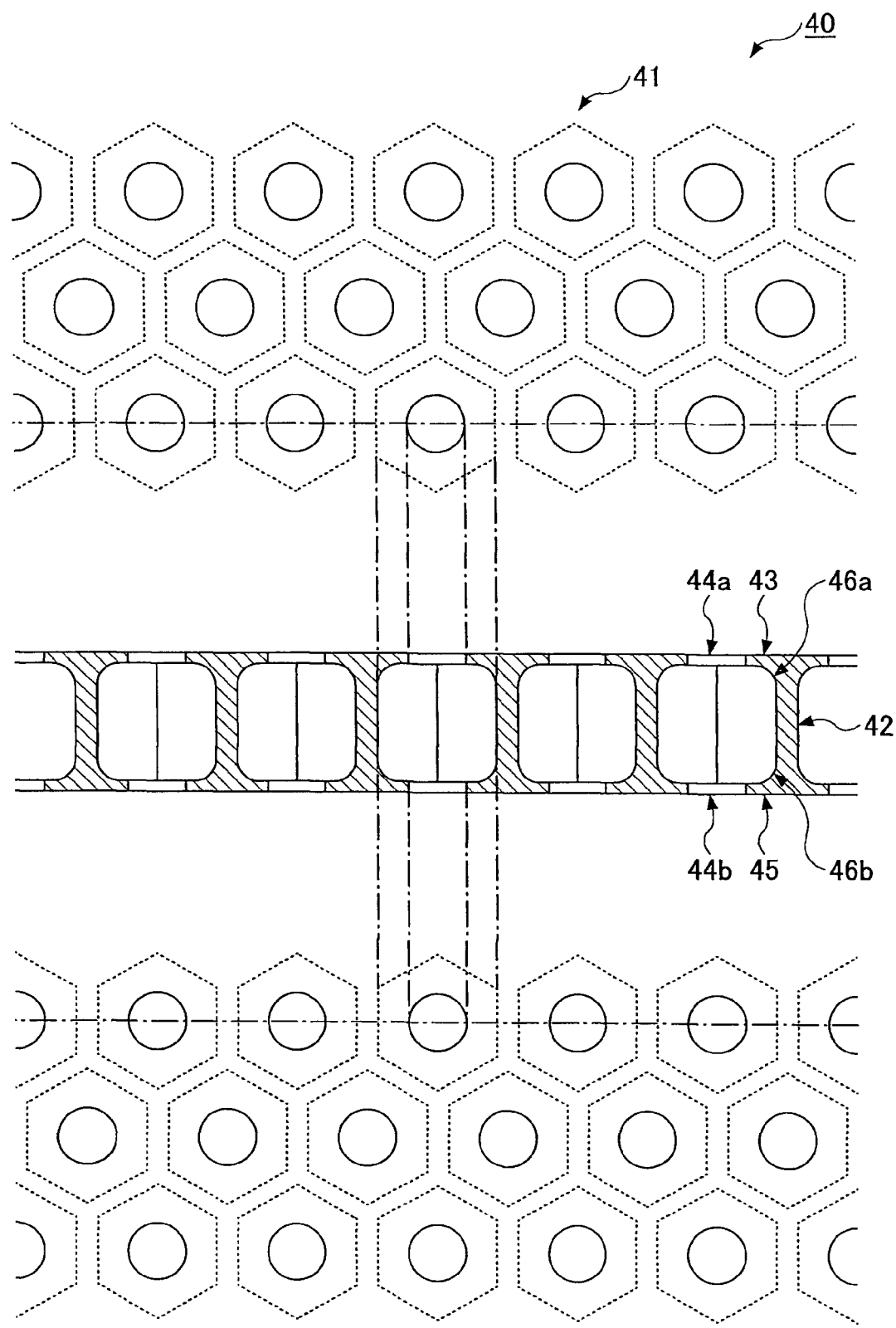
FIG. 6 is a group of views illustrating another example of a hollow structure that may be used in the second embodiment of the present invention, the upper view being a plan view, the middle view being a cross-sectional view, and the lower view being a bottom view.
Figure 7A:
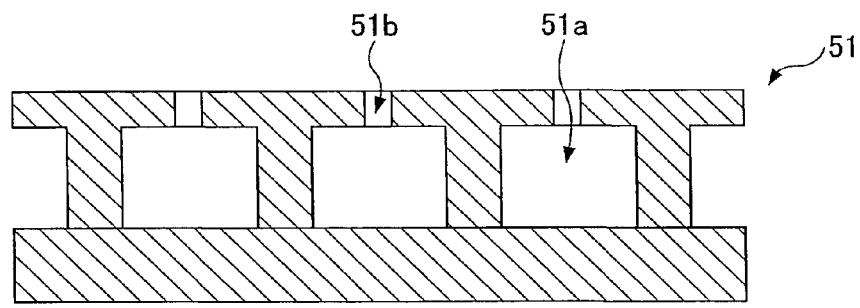
FIGS. 7A-7D are diagrams illustrating an example of a manufacturing method of a hollow structure that may be used in the first and second embodiments of the present invention.
Figure 7B:
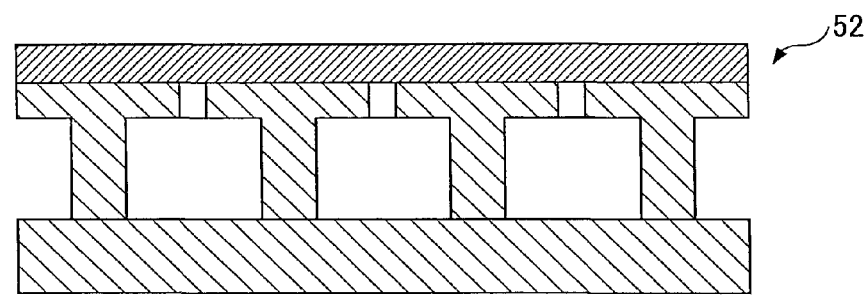
Figure 7C:
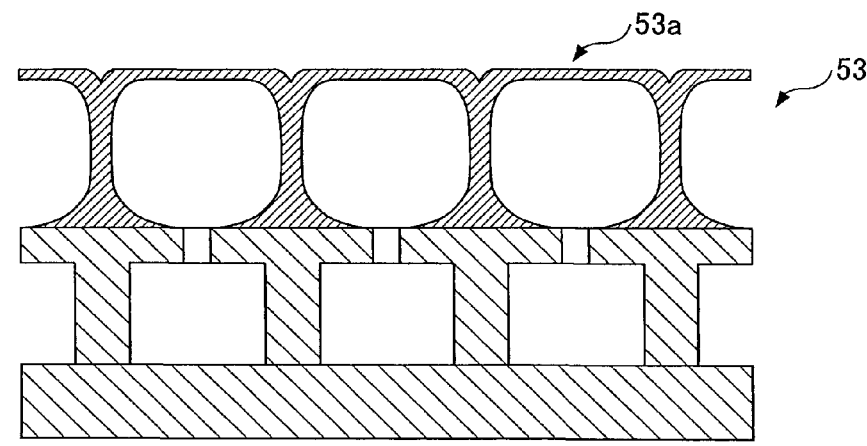
Figure 7D:
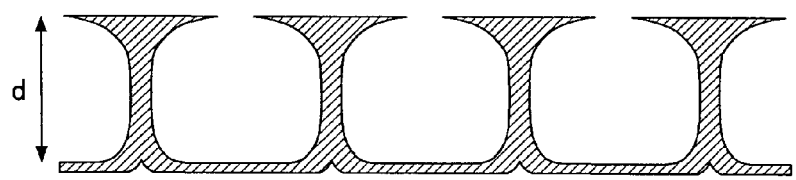

FIG. 6 illustrates another hollow structure 40 that may be used in the second embodiment of the present invention. The hollow structure 40 includes plural hexagonal-prism-shaped cells 41 disposed in a plane. The adjacent cells 41 are separated from each other by a cell wall 42. Each cell 41 has an opening 44a and an opening 44b in an upper wall 43 and a lower wall 45, respectively, of the hollow structure 40. A joint portion 46a of the upper wall 43 with the cell wall 42 and a joint portion 46b of the lower wall 45 with the cell wall 42 have curved cross-sectional shapes.

A hollow structure that may be used in the second embodiment of the present invention is not limited to the hollow structure 30 of FIG. 5 and the hollow structure 40 of FIG. 6. For example, the cells may be of different sizes. Further, the joint portions may not have curved cross-sectional shapes.

A display element having the characteristic (5) is described below with reference to the hollow structure 40 (a sheet having a honeycomb structure) of FIG. 6. The thickness of the cell wall 42 of the hollow structure 40 is in the range of 0.01-10 μm, and preferably in the range of 0.05-5 μm. With this configuration, the display element including the hollow structure 40 can provide improved display properties. This is because reducing the thickness of the cell wall 42, which does not have a display function, improves reflectance and contrast. If the thickness of the cell wall 42 is less than 0.01 μm, the strength of the hollow structure 40 is reduced. If the thickness of the cell wall 22 is greater than 10 μm, the properties of the display element are reduced in terms of reflectance and contrast.

A display element having the characteristic (6) is described below with reference to the hollow structure 40 (a sheet having a honeycomb structure) of FIG. 6. The thickness of each of the upper wall 43 and the lower wall 45 of the hollow structure 40 is in the range of 0.01-10 μm, and preferably in the range of 0.05-5 μm. With this configuration, the display element including the hollow structure 40 can provide improved display properties. The upper wall 43 and the lower wall 45 with such reduced thicknesses provide advantageous effects in terms of reflectance and drive voltage. If the thickness of the upper wall 43 and the lower wall 45 is less than 0.01 μm, the strength of the hollow structure 40 is reduced. If the thickness is greater than 10 μm, the properties of the display element are reduced in terms of reflectance and drive voltage.

A display element having the characteristic (7) is described below with reference to the hollow structure 40 (a sheet having a honeycomb structure) of FIG. 6. In the hollow structure 40, the joint portion 46a and the joint portion 46b have curved cross-sectional shapes, a curvature radius of each of which is in the range of 0.1-50 μm, and preferably in the range of 1-10 μm. With this configuration, the display element including the hollow structure 40 can provide improved display properties and strength. Thus, the display element can exhibit sufficient strength even when bent for use. That is, the provision of the joint portions 46a and 46b having a greater thickness than the cell wall 42 can improve the strength of the display element. If the curvature radius is less than 0.1 μm, the strength of the display element is sufficient to tolerate being slightly bent, but not sufficient to tolerate being rolled up. If the curvature radius is greater than 50 μm, the display properties are reduced, especially in terms of reflectance.

A display element having the characteristic (8) is described below with reference to the hollow structure 40 (a sheet having a honeycomb structure) of FIG. 6. In the hollow structure 40, a solvent having one or more types of white particles/colored particles dispersed therein is disposed in the cells 41. The openings 44a and 44b of the cells 41 are sealed with a resin insoluble in the solvent. The resin with which the openings 44a and 44b are sealed is a film, the thickness of which is in the range of 0.1-10 μm, and preferably in the range of 0.5-5 μm. With this configuration, the display element including the hollow structure 40 can provide improved display properties and strength. The resin film with such a reduced thickness provides advantageous effects in terms of reflectance and drive voltage. If the film thickness is less than 0.1 μm, the strength of the hollow structure 40 is reduced. If the film thickness is greater than 10 μm, the properties of the display element are reduced in terms of reflectance and drive voltage.

According to an embodiment of the present invention, in order to improve the strength of the hollow structure against warping and bending, the hollow structure is preferably made of a material obtained by drying a plastic material. The plastic material preferably contains, but not necessarily, a water-soluble resin in order to improve the solvent resistance of the hollow structure. Examples of a water-soluble resin include polyvinyl alcohol, polyvinylpyrrolidone, polyurethane, pullulan, albumin, CMC, polyacrylic acid, cellulose, starch, gelatine, alginate, guar gum, gum Arabic, carrageenan, tragacanth, pectin, dextrin, casein, collagen, polyvinyl methyl ether, carboxy vinyl polymer, sodium polyacrylate, polyethylene glycol, ethylene oxide, agar, locust bean gum, xanthan gum, cyclodextrin, tannic acid, karaya gum, gellan gum, furcelleran, tragacanth gum, lecithin, chitin, chitosan, chondroitin sulfate sodium, lignin sulfonic acid, methylcellulose, hydroxythyl methyl cellulose, polyacrylamide, polyethylenimine, dimethylaminoethyl polyacrylate, dimethylaminoethyl polymethacrylate, polyethylene oxide, and polyallylamine. A mixture of two or more of these materials may be used. The term "water-soluble resin" as used herein refers to a resin soluble or swellable in water.

According to an embodiment of the present invention, the hollow structure is preferably made of a material obtained by curing a plastic material by ultraviolet irradiation in order to improve the strength of the hollow structure against warping and bending. The plastic material preferably contains an ultraviolet curing resin such as an urethane acrylic resin, an epoxy acrylic resin, and an alkoxy acrylic resin.

According to an embodiment of the present invention, the one or more types of white particles dispersed in the solvent may include, but is not limited to, inorganic particles such as titanium oxide and alumina and organic particles such as polyvinyl naphthalene. The one or more types of colored particles dispersed in the solvent may include carbon black, azoic pigment, phthalocyanine based pigment, quinacridone based pigment, anthraquinone based pigment, dioxazine based pigment, and dyeing lake pigment. The solvent may include silicone oil and isoparaffinic hydrocarbon.

FIGS. 7A-7D illustrate an example of a method of manufacturing a hollow structure 53 that may be used in the first and second embodiments of the present invention. To manufacture the hollow structure 53, a substrate 51 is used that includes plural independent cavities 51a each having a narrow opening 51b (see FIG. 7A). First, a plastic film 52 is formed on the substrate 51 using a slit coater or other suitable device (see FIG. 7B). A ventilation space may be provided at the side of the plastic film 52 so as to dry the plastic film 52. Then, the substrate 51 with the plastic film 52 formed thereon is placed in a vacuum chamber or the like. The pressure is reduced at least at the side of the plastic film 52 to cause the air in the cavities 51a to expand. Since the cavities 51a are sealed with the plastic film 52, the plastic film 52 is deformed (stretched) due to the expansion of the air, so that the hollow structure 53 is formed on the substrate 51 (see FIG. 7C). Finally, the hollow structure 53 is separated from the substrate 51, so that the hollow structure 53 with openings in the upper wall is obtained (see FIG. 7D). If the cavities 51a of the substrate 51 are arranged in a tetragonal lattice (see FIG. 8A), the hollow structure 53 is obtained that includes square-prism-shaped cells arranged in a tetragonal lattice (see FIGS. 1 and 2). If the cavities 51a of the substrate 51 are arranged in a hexagonal close-packed lattice (see FIG. 8B), the hollow structure 53 is obtained that includes hexagonal-prism-shaped cells arranged in a hexagonal close-packed lattice (see FIGS. 3 and 4).

A depth d of the cells of the hollow structure 53 may be properly controlled by the vacuum level of the reduced pressure. Specifically, when in a high vacuum, the expansion of the air inside the cavities 51a is large, so that the depth d is great. When in a low vacuum, the expansion of the air inside the cavities 51a is small, so that the depth d is small. In the case where the vacuum level is further increased to increase the expansion of the air inside the cavities 51a, ceiling portions 53a of the hollow structure 53 become thinner, eventually forming openings in the ceiling portions 53a. Thus, the hollow structure 53 with openings in the upper and lower walls is obtained (see FIGS. 5 and 6).

Examples of the substrate 51 may include a nickel substrate, a silicon substrate, a glass substrate with a resist pattern thereon, a copper clad board (copper/polyimide laminate substrate), an etched glass substrate, and a resin substrate made of polyimide, PTE, or acrylic resin. The cavities 51a of the substrate 51 are preferably subjected to hydrophobic treatment.

The thicknesses of the cell wall, the upper wall, and the lower wall, and the curvature radii of curved cross-sectional shapes of the joint portions of the upper and lower walls with the cell wall of the hollow structure 53 can be controlled by the thickness and the material of the plastic film 52 and the reduced pressure condition (pressure level). The thinner the plastic film 52, the lower the thickness of the walls, and the lower the curvature radius of the joint portions. The lower the pressure, the greater the thickness of the walls, and the lower the curvature radius of the joint portions. The lower the viscosity of the plastic film 52, the lower the thickness of the walls, and the lower the curvature radius of the joint portions.

The cell wall, the upper wall, and the lower wall of the hollow structure 53 are formed utilizing the surface tension of the plastic material. That is, it is possible to reduce the thickness of the walls of the hollow structure 53 compared to a hollow structure formed by microembossing or imagewise exposure. It is difficult to achieve the shape of the hollow structure 53 by using microembossing or imagewise exposure.

An image display device according to an embodiment of the present invention may include a display unit, the display unit including one of the display elements of the first and second embodiments and a drive element for applying a voltage to the display element. An image display system according to an embodiment of the present invention includes systems using the above-described image display device, such as an electronic book, an advertisement display system, a timetable system, and recycled paper.

EXAMPLES

Hollow Structure Manufacture Example 1

A hollow structure 53 was manufactured using the hollow structure manufacturing method of FIGS. 7A-7D. First, as a plastic material, a polyurethane aqueous solution Hydran WLS-201 (Dainippon Ink and Chemicals, Inc.) was applied onto a substrate 51 using a slit coater to form a plastic film 52. Then the substrate 51 with the plastic film 52 formed thereon was placed in a vacuum chamber, and the pressure in the vacuum chamber was reduced to expand the air inside the cavities. The residual moisture in polyurethane was evaporated in a vacuum to completely dry and cure the plastic film 52. When the vacuum level of the reduced pressure was set to 1 kPa or lower, openings were formed in ceiling portions 53a of the hollow structure 53.

In this way, the hollow structure 53 was obtained in which the cell wall has a thickness in the range from 1 to 10 μm; the upper and lower walls have a thicknesses in the range from 1 to 10 μm; and joint portions of the upper and lower walls with the cell wall have curved cross-sectional shapes each having a curvature radius in the range from 5 to 50 μm.

Hollow Structure Manufacture Example 2

A hollow structure 53 was manufactured using the hollow structure manufacturing method of FIGS. 7A-7D. First, as a plastic material, an aqueous solution containing 5-30 wt % of gelatin MC-243 (Jellice Co., Ltd.) was applied onto a substrate 51 using a slit coater to form a plastic film 52. Then, the substrate 51 with the plastic film 52 formed thereon was placed in a vacuum chamber, and the pressure in the vacuum chamber was reduced to expand the air inside the cavities. The residual moisture in gelatin was evaporated in a vacuum to completely dry and cure the plastic film 52. Formation of openings in the ceiling portions 53a of the hollow structure 53 depends on the gelatin concentration and the vacuum level of the reduced pressure. If the gelatin concentration is low, openings are formed even when the vacuum level of the reduced pressure is low. If the gelatin concentration is high, openings are formed when the vacuum level of the reduced pressure is high.

In this way, the hollow structure 53 was obtained in which the cell wall has a thickness in the range from 0.01 to 5 μm; the upper and lower walls have a thicknesses in the range from 0.01 to 2 μm; and joint portions of the upper and lower walls with the cell wall have curved cross-sectional shapes each having a curvature radius in the range from 0.1 to 20 μm.

Hollow Structure Manufacture Example 3

A hollow structure 53 was manufactured using the hollow structure manufacturing method of FIGS. 7A-7D. First, as a plastic material, an aqueous solution containing 5-30 wt % of POVAL (Polyvinyl Alcohol) PVA117 (KURARAY Co., Ltd.) was applied onto a substrate 51 using a slit coater to form a plastic film 52. Then, the substrate 51 with the plastic film 52 formed thereon was placed in a vacuum chamber, and the pressure in the vacuum chamber was reduced to expand the air inside the cavities. The residual moisture in polyvinyl alcohol was evaporated in a vacuum to completely dry and cure the plastic film 52. Formation of openings in the ceiling portions 53a of the hollow structure 53 depends on the concentration of polyvinyl alcohol and the vacuum level of the reduced pressure. If the concentration of polyvinyl alcohol is low, openings are formed even when the vacuum level of the reduced pressure is low. If the concentration of polyvinyl alcohol is high, openings are formed when the vacuum level of the reduced pressure is high.

In this way, the hollow structure 53 was obtained in which the cell wall has a thickness in the range from 3 to 10 μm; the upper and lower walls have a thicknesses in the range from 1 to 10 μm; and joint portions of the upper and lower walls with the cell wall have curved cross-sectional shapes each having a curvature radius in the range from 10 to 50 μm.

Hollow Structure Manufacture Example 4

A hollow structure 53 was manufactured using the hollow structure manufacturing method of FIGS. 7A-7D. First, a fluorochemical surfactant Novec FC-4430 (3M Company) was added to an alkoxy acrylate PEG 400DA (Diacel-Cytec Company Ltd.) for reducing the surface tension of the alkoxy acrylate, thereby preparing a plastic material. Then, a solution containing the plastic material was applied onto a substrate 51 to form a plastic film 52. Then, the substrate 51 with the plastic film 52 formed thereon was placed in a vacuum chamber, and the pressure in the vacuum chamber was reduced to expand the air inside the cavities. When the vacuum level reached 50 kPa, ultraviolet rays were irradiated to cure the alkoxy acrylate.

In this way, the hollow structure 53 was obtained in which the cell wall has a thickness in the range from 0.01 to 3 µm; the upper and lower walls have a thicknesses in the range from 0.01 to 1 µm; and joint portions of the upper and lower walls with the cell wall have curved cross-sectional shapes each having a curvature radius in the range from 0.1 to 5 µm.

Hollow Structure Manufacture Example 5

A hollow structure 53 was manufactured using the hollow structure manufacturing method of FIGS. 7A-7D. First, a fluorochemical surfactant Novec FC-4430 (3M Company) was added to an epoxy acrylate AQ9 (Arakawa Chemical Industries, Ltd.) for reducing the surface tension of the epoxy acrylate, thereby preparing a plastic material. Then, a solution containing the plastic material was applied onto a substrate 51 to form a plastic film 52. Then, the substrate 51 with the plastic film 52 formed thereon was placed in a vacuum chamber, and the pressure in the vacuum chamber was reduced to expand the air inside the cavities. When the vacuum level reached 50 kPa, ultraviolet rays were irradiated to cure the epoxy acrylate.

In this way, the hollow structure 53 was obtained in which the cell wall has a thickness in the range from 0.01 to 5 µm; the upper and lower walls have a thicknesses in the range from 0.01 to 1 µm; and joint portions of the upper and lower walls with the cell wall have curved cross-sectional shapes each having a curvature radius in the range from 0.1 to 5 µm.
(Manufacture of Electrophoresis Liquid)

Titanium oxide R-960 (Dupont) having a graft-polymerized surface with lauryl methacrylate was used as white particles. Carbon black PRINTEX A (Degussa) of which surface was graft-polymerized with 2-ethylhexyl methacrylate was used as colored particles. Then, the white particles and colored particles were dispersed in an isoparaffinic hydrocarbon Isopar G (Exxon Mobil Corporation) using a dispersant Span 85 (Imperial Chemical Industries) and a charge control agent Solsperse 17000 (Avecia) to prepare an electrophoresis liquid. The composition of the electrophoresis liquid was 40 wt % of the white particles, 2 wt % of the colored particles, 0.5 wt % of Span 85, 0.5 wt % of Solsperse 17000, and 57 wt % of Isopar G.

Example 1

Figure 9:
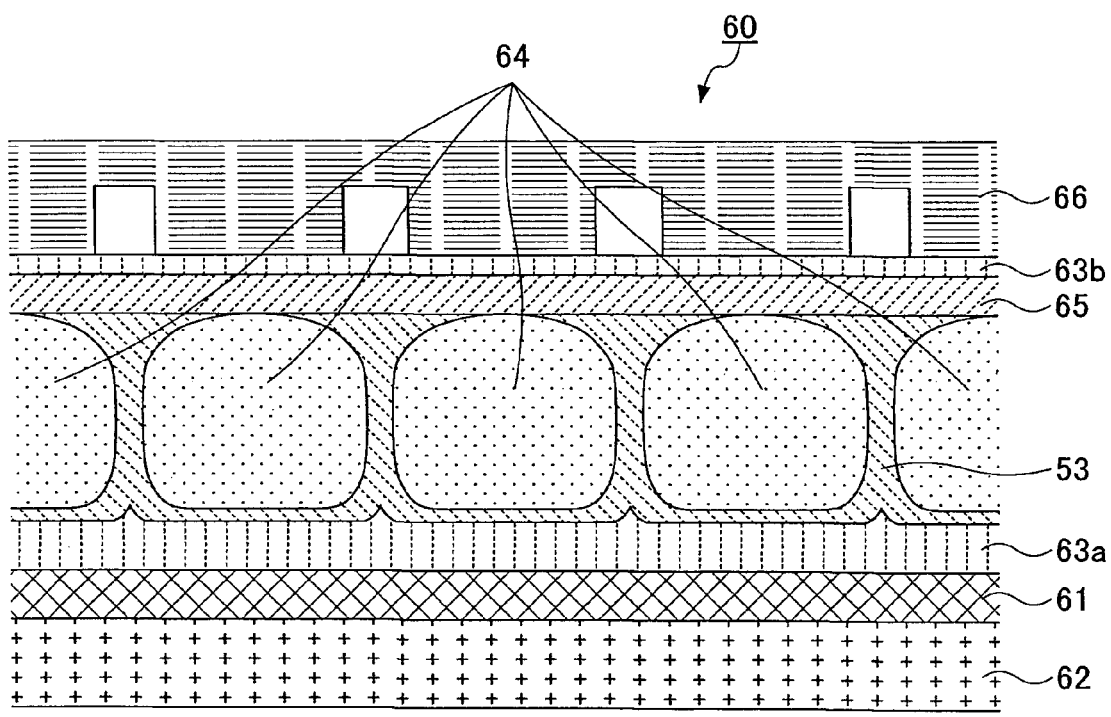
FIG. 9 is a cut-away side view showing an image display device of Example 1.

An image display device 60 shown in FIG. 9 was manufactured. A hollow structure used was one of the hollow structures 53 (see FIGS. 3 and 4) of Manufacture Examples 1-5, which includes plural cells disposed in a plane. Each of the cells has an opening. In the hollow structure 53, the thickness of the cell wall was 2 µm; the thickness of each of the upper and lower walls was 1 µm; the depth of each cell was 50 µm; the cell-to-cell pitch was 150 µm; and joint portions of the upper and lower walls with the cell wall had curved cross-sectional shapes of a 5 µm curvature radius.

In the image display device 60, the lower wall of the hollow structure 53 is bonded by an adhesive layer 63a to a PET film 62 with an ITO layer 61 formed thereon. An ultraviolet curing adhesive, an epoxy-based adhesive, or other suitable adhesives may be used for bonding. This structure can be obtained by bonding the PET film 62 with the ITO layer 61 formed thereon onto the hollow structure 53 (see FIG. 7C) and then separating the hollow structure 53 from the substrate 51.

The cells of the hollow structure 53 are filled with an electrophoresis liquid 64, and the openings of the cells are sealed. The openings may be sealed with a water-soluble resin which is insoluble in the electrophoresis liquid 64, such as polyurethane, gelatin, and polyvinyl alcohol. More specifically, an aqueous solution containing a water-soluble resin was applied onto the electrophoresis liquid 64 using a slit coater and was dried to form a sealing film 65 of 5 µm thickness.

The sealing film 65 is bonded to a voltage drive circuit 66 by an adhesive layer 63b. An ultraviolet curing adhesive, an epoxy-based adhesive, or other suitable adhesives may be used for bonding. The thinner the sealing film 65, the smaller the voltage loss, allowing driving with reduced voltage.

Example 2

Figure 10:
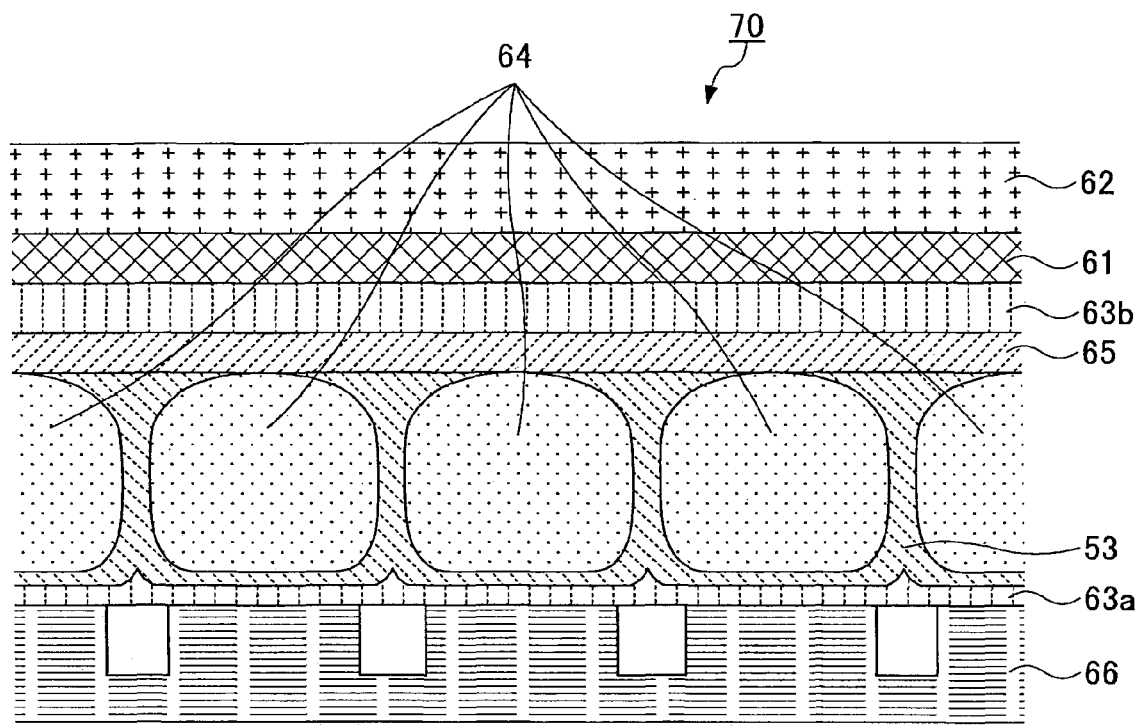
FIG. 10 is a cut-away side view showing an image display device of Example 2.

An image display device 70 shown in FIG. 10 was manufactured. A hollow structure used was one of the hollow structures 53 (see FIGS. 3 and 4) of Manufacture Examples 1-5, which includes plural cells disposed in a plane. Each of the cells has an opening. In the hollow structure 53, the thickness of the cell wall was 2 µm; the thickness of each of the upper and lower walls was 1 µm; the depth of each cell was 50 µm; the cell-to-cell pitch was 150 µm; and joint portions of the upper and lower walls with the cell wall had curved cross-sectional shapes of a 5 µm curvature radius.

In the image display device 70, the lower wall of the hollow structure 53 is bonded by an adhesive layer 63a to a voltage drive circuit 66. An ultraviolet curing adhesive, an epoxy-based adhesive, or other suitable adhesives may be used for bonding. This structure can be obtained by bonding the voltage drive circuit 66 onto the hollow structure 53 (see FIG. 7C) and then separating the hollow structure 53 from the substrate 51.

The cells of the hollow structure 53 are filled with an electrophoresis liquid 64, and the openings of the cells are sealed. The openings may be sealed with a water-soluble resin which is insoluble in the electrophoresis liquid 64, such as polyurethane, gelatin, and polyvinyl alcohol. More specifically, an aqueous solution containing a water-soluble resin was applied onto the electrophoresis liquid 64 using a slit coater and was dried to form a sealing film 65 of a 5 µm thickness.

The sealing film 65 is bonded by an adhesive layer 63b to a PET film 62 with an ITO layer 61 formed thereon. An ultraviolet curing adhesive, an epoxy-based adhesive, or other suitable adhesives may be used for bonding. The thinner the sealing film 65, the smaller the voltage loss, allowing driving with reduced voltage.

Example 3

Figure 11:
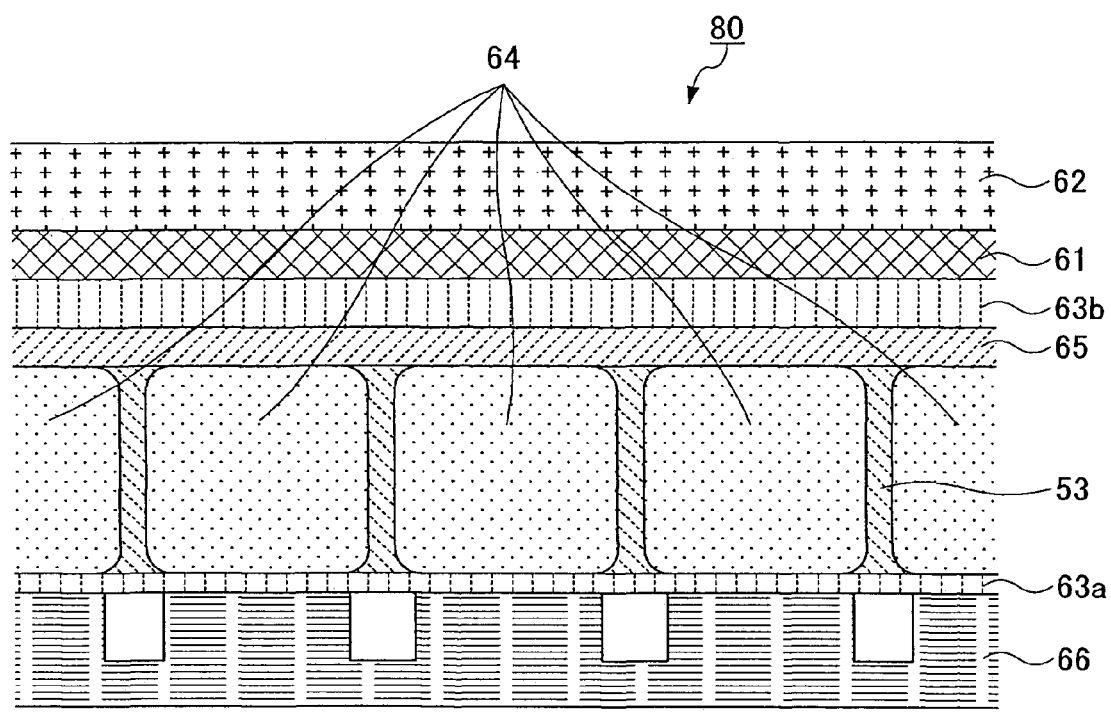
FIG. 11 is a cut-away side view showing an image display device of Example 3.

An image display device 80 shown in FIG. 11 was manufactured. A hollow structure used was one of the hollow structures 53 (see FIGS. 6 and 4) of Manufacture Examples 1-5, which includes plural cells disposed in a plane. Each cell has opposite openings. In the hollow structure 53, the thickness of the cell wall was 2 µm; the thickness of each of the upper and lower walls was 1 µm; the depth of each cell was 50 µm; the cell-to-cell pitch was 150 µm; and joint portions of the upper and lower walls with the cell wall had curved cross-sectional shapes of a 5 µm curvature radius.

In the image display device 80, the lower wall of the hollow structure 53 is bonded by an adhesive layer 63a to a voltage drive circuit 66. An ultraviolet curing adhesive, an epoxy-based adhesive, or other suitable adhesives may be used for bonding. This structure can be obtained by bonding the voltage drive circuit 66 onto the hollow structure 53 (see FIG. 7C) and then separating the hollow structure 53 from the substrate 51.

The cells of the hollow structure 53 are filled with an electrophoresis liquid 64, and the openings of the cells are sealed. The openings may be sealed with a water-soluble resin which is insoluble in the electrophoresis liquid 64, such as polyurethane, gelatin, and polyvinyl alcohol. More specifically, an aqueous solution containing a water-soluble resin was applied onto the electrophoresis liquid 64 using a slit coater and was dried to form a sealing film 65 of a 5 µm thickness.

The sealing film 65 is bonded by an adhesive layer 63b to a PET film 62 with an ITO layer 61 formed thereon. An ultraviolet curing adhesive, an epoxy-based adhesive, or other suitable adhesives may be used for bonding. The thinner the sealing film 65, the smaller the voltage loss, allowing driving with reduced voltage.

Example 4

Figure 12:
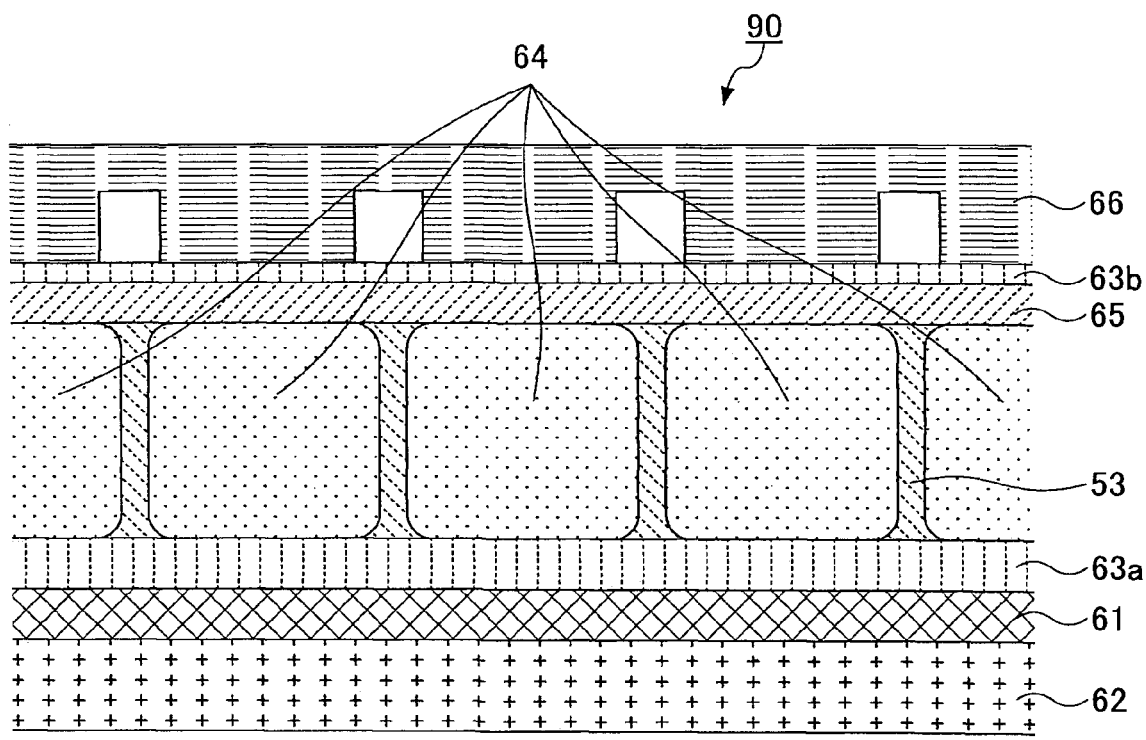
FIG. 12 is a cut-away side view showing an image display device of Example 4.
Figure 13A:
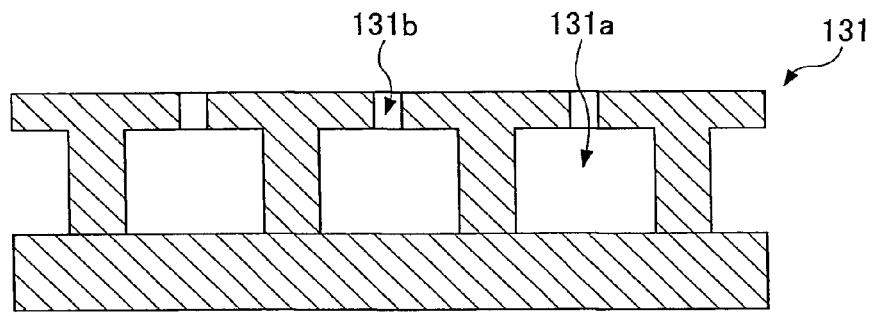
FIGS. 13A-13D are diagrams illustrating an example of a manufacturing method of a hollow structure that may be used in a third embodiment of the present invention.
Figure 13B:
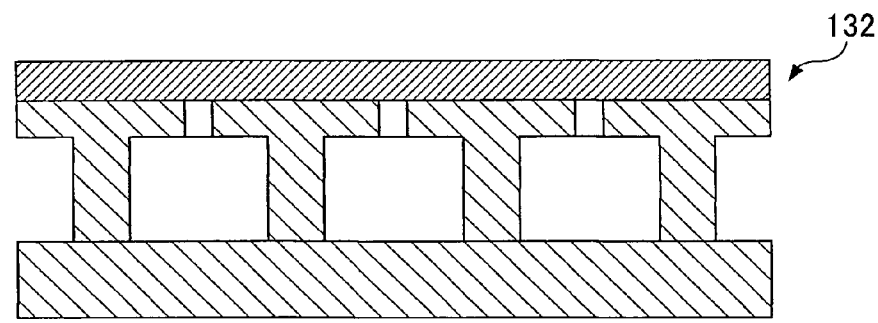
Figure 13C:
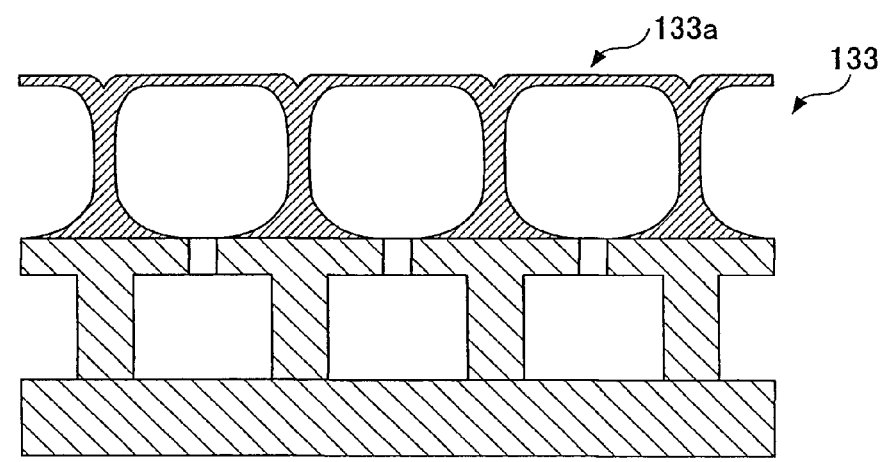
Figure 13D:
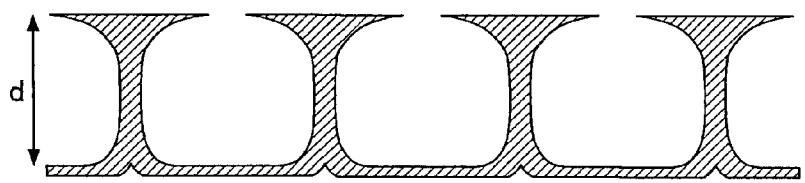

An image display device 90 shown in FIG. 12 was manufactured. A hollow structure used was one of the hollow structures 53 (see FIGS. 6 and 4) of Manufacture Examples 1-5, which includes plural cells disposed in a plane. Each cell has opposite openings. In the hollow structure 53, the thickness of the cell wall was 2 µm; the thickness of each of the upper and lower walls was 1 µm; the depth of each cell was 50 µm; the cell-to-cell pitch was 150 µm; and joint portions of the upper and lower walls with the cell wall had curved cross-sectional shapes of a 5 µm curvature radius.

In the image display device 90, the lower wall of the hollow structure 53 is bonded by an adhesive layer 63a to a PET film 62 with an ITO layer 61 formed thereon. An ultraviolet curing adhesive, an epoxy-based adhesive, or other suitable adhesives may be used for bonding. This structure can be obtained by bonding the PET film 62 with the ITO layer 61 formed thereon onto the hollow structure 53 (see FIG. 7C) and then separating the hollow structure 53 from the substrate 51.

The cells of the hollow structure 53 are filled with an electrophoresis liquid 64, and the openings of the cells are sealed. The openings may be sealed with a water-soluble resin which is insoluble in the electrophoresis liquid 64, such as polyurethane, gelatin, and polyvinyl alcohol. More specifically, an aqueous solution containing a water-soluble resin was applied onto the electrophoresis liquid 64 using a slit coater and was dried to form a sealing film 65 of a 5 µm thickness.

The sealing film 65 is bonded to a voltage drive circuit 66 by an adhesive layer 63b. An ultraviolet curing adhesive, an epoxy-based adhesive, or other suitable adhesives may be used for bonding. The thinner the sealing film 65, the smaller the voltage loss, allowing driving with reduced voltage.

Reference Example 1

An image display device 90 was manufactured that includes a hollow structure including cells of 10 mm by 10 mm in width and length and 50 mm in depth in place of the hollow structure 53. The image display device 90 was manufactured in the same manner as in Example 4 except that an adhesive layer 63a was not provided.
(Evaluation Method and Evaluation Result)

A voltage of 10 V was applied from the voltage drive circuit 66, and the white reflectance, the black reflectance, and the contrast were measured using an actinometer. Table 1 shows the examination result.

TABLE 1

|  | Example 1 | Example 2 | Example 3 | Example 4 | Reference Example 1 |
|---|---|---|---|---|---|
| White Reflectance (%) | 38 | 38 | 40 | 41 | 43 |
| Black Reflectance (%) | 1 | 1 | 1 | 1 | 1 |
| Contrast | 38 | 38 | 40 | 41 | 43 |
| White Reflectance (Ratio to Reference Example) | 0.88 | 0.88 | 0.93 | 0.95 | 1 |

Referring to Table 1, the image display devices of Examples 1-4 had slightly lower white reflectances than the image display device of Reference Example, which is believed due to the presence of the wall of the hollow structure 53, the sealing film 65, and/or the adhesive layer 63a/63b. The image display device of Example 4 includes the adhesive layer 63a at the PET film 62 side, which is the only additional component compared to Reference Example. Therefore, the image display device of Example 4 showed the smallest reduction of the white reflectance from the image display device of Reference Example. It is to be noted that the opening ratio of the cells in the hollow structure 53 is calculated as 0.97 based on the cell-to-cell pitch (150 µm) and the thickness of the cell wall (2 µm).

According to a third embodiment of the present invention, a display element comprises a hollow structure. The hollow structure includes plural cells disposed in a plane, each having a first opening and a second opening respectively in a first wall and a second wall, opposite to the first wall, of the hollow structure; and a partition wall separating the adjacent cells. A solvent having one or more types of white particles and/or colored particles dispersed therein is disposed in the cells. One of the first wall with the first openings and the second wall with the second openings is connected to a transparent conductive film. The display element has at least one of the following characteristics (5)-(8). The openings in the other wall not connected to the transparent conductive film may be sealed with a resin insoluble in the solvent having one or more types of white particles and/or colored particles dispersed therein or may be sealed with an electrode.

The display element of the third embodiment preferably has at least one of the following characteristics (9)-(11).

(9) The thickness of the partition wall (cell wall) separating the adjacent cells is in the range of 0.01-10 µm, and preferably in the range of 0.05-5 µm.

(10) The thickness of each of the first wall and the second wall of the hollow structure is in the range of 0.01-10 µm, and preferably in the range of 0.05-5 µm.

(11) A first joint portion of the first wall with the cell wall and a second joint portion of the second wall with the cell wall have curved cross-sectional shapes, a curvature radius of each of which is in the range of 0.1-50 µm, and preferably in the range of 1-10 µm. The thicknesses and curvature radii are average values, each obtained by measuring ten or more arbitrary portions. The measurement can be done by scanning the cross section of the display element or the hollow structure using a scanning electron microscope or other suitable device.

Examples of a hollow structure that may be used in the third embodiment of the present invention include the above-described hollow structures 30 of FIG. 5 and the hollow structures 40 of FIG. 6. A hollow structure that may be used in the third embodiment of the present invention is not limited to the hollow structure 30 of FIG. 5 and the hollow structure 40 of FIG. 6. For example, the cells may be of different sizes. Further, the joint portions may not have curved cross-sectional shapes.

A display element having the characteristic (9) is described below with reference to the hollow structure 40 (a sheet having a honeycomb structure) of FIG. 6. The thickness of the cell wall 42 of the hollow structure 40 is in the range of 0.01-10 µm, and preferably in the range of 0.05-5 µm. With this configuration, the display element including the hollow structure 40 can provide improved display properties. This is because reducing the thickness of the cell wall 42, which does not have a display function, improves reflectance and contrast. If the thickness of the cell wall 42 is less than 0.01 µm, the strength of the hollow structure 40 is reduced. If the thickness of the cell wall 42 is greater than 10 µm, the properties of the display element are reduced in terms of reflectance and contrast.

A display element having the characteristic (10) is described below with reference to the hollow structure 40 (a sheet having a honeycomb structure) of FIG. 6. The thickness of each of the upper wall 43 and the lower wall 45 of the hollow structure 40 is in the range of 0.01-10 µm, and preferably in the range of 0.05-5 µm. With this configuration, the display element including the hollow structure 40 can provide improved display properties. The upper wall 43 and the lower wall 45 with such reduced thicknesses provide advantageous effects in terms of reflectance and drive voltage. If the thickness of the upper wall 43 and the lower wall 45 is less than 0.01 µm, the strength of the hollow structure 40 is reduced. If the thickness is greater than 10 µm, the properties of the display element are reduced in terms of reflectance and drive voltage.

A display element having the characteristic (11) is described below with reference to the hollow structure 40 (a sheet having a honeycomb structure) of FIG. 6. In the hollow structure 40, the joint portion 46a and the joint portion 46b have curved cross-sectional shapes, a curvature radius of each of which is in the range of 0.1-50 µm, and preferably in the range of 1-10 µm. With this configuration, the display element including the hollow structure 40 can provide improved display properties and strength. Thus, the display element can exhibit sufficient strength even when bent for use. That is, the provision of the joint portions 46a and 46b having a greater thickness than the cell wall 42 can improve the strength of the display element. If the curvature radius is less than 0.1 µm, the strength of the display element is sufficient to tolerate being slightly bent, but not sufficient to tolerate being rolled up. If the curvature radius is greater than 50 µm, the display properties are reduced, especially in terms of reflectance.

According to the third embodiment of the present invention, in the case where the openings in the wall not connected to the transparent conductive film are sealed with a resin as described above, the resin with which the openings are sealed is preferably a film, the thickness of which is in the range of 0.1-10 µm, and preferably in the range of 0.5-5 µm.

A display element having this characteristic is described below with reference to the hollow structure 40 (a sheet having a honeycomb structure) of FIG. 6. In the hollow structure 40, a solvent having one or more types of white particles/colored particles dispersed therein is disposed in the cells 41. The openings 44a or the openings 44b of the cells 41 are sealed with a resin insoluble in the solvent. The resin with which the openings 44a or the openings 44b are sealed is a film, the thickness of which is in the range of 0.1-10 µm, and preferably in the range of 0.5-5 µm. With this configuration, the display element including the hollow structure 40 can provide improved display properties and strength. The resin film with such a reduced thickness provides advantageous effects in terms of reflectance and drive voltage. If the film thickness is less than 0.1 µm, the strength of the hollow structure 40 is reduced. If the film thickness is greater than 10 µm, the properties of the display element are reduced in terms of reflectance and drive voltage.

Figure 15A:
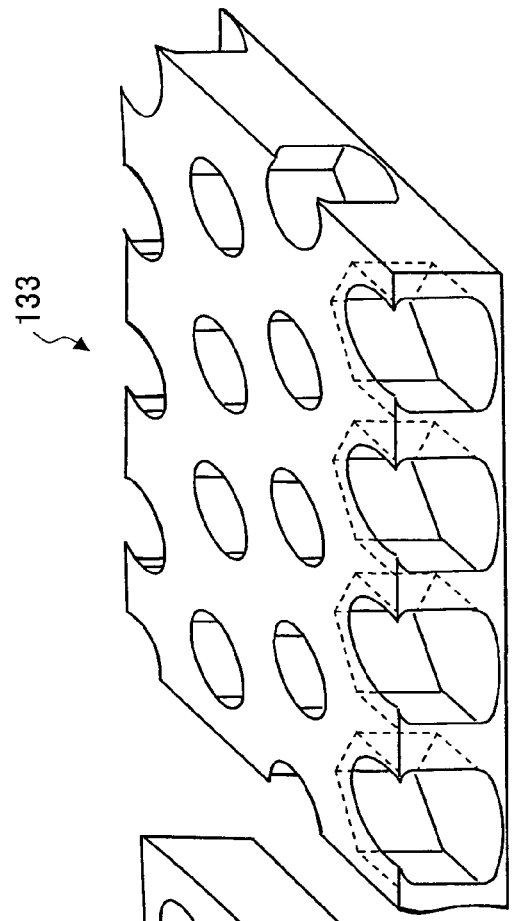
FIGS. 15A and 15B are diagrams each illustrating an intermediate produced by the hollow structure manufacturing method of FIGS. 13A-13D.
Figure 15B:
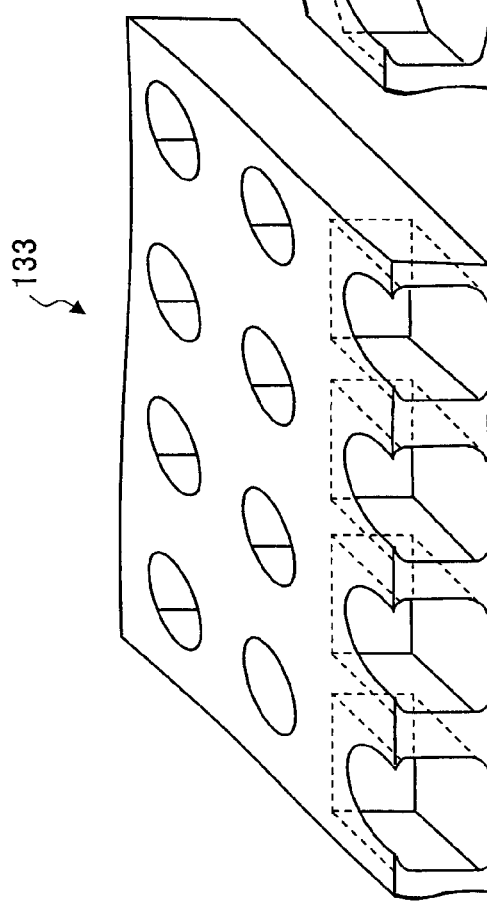

FIGS. 13A-13D illustrate an example of a manufacturing method of a hollow structure 133 that may be used in the third embodiment of the present invention. To manufacture the hollow structure 133, a substrate 131 is used that includes plural independent cavities 131a each having a narrow opening 131b (see FIG. 13A). First, a plastic film 132 is formed on the substrate 131 using a slit coater or other suitable device (see FIG. 13B). A ventilation space may be provided at the side of the plastic film 132 so as to dry the plastic film 132. Then, the substrate 131 with the plastic film 132 formed thereon is placed in a vacuum chamber or the like. The pressure is reduced at least at the side of the plastic film 132 to cause the air in the cavities 131a to expand. Since the cavities 131a are sealed with the plastic film 132, the plastic film 132 is deformed (stretched) due to the expansion of the air, so that an intermediate 133 is formed on the substrate 131 (see FIG. 13C). Finally, the intermediate 133 is separated from the substrate 131, so that the intermediate 133 with openings in the upper wall is obtained (see FIG. 13D). If the cavities 131a of the substrate 131 are arranged in a tetragonal lattice (see FIG. 14A), the intermediate 133 is obtained that includes square-prism-shaped cells arranged in a tetragonal lattice (see FIG. 15A). If the cavities 131a of the substrate 131 are arranged in a hexagonal close-packed lattice (see FIG. 14B), the intermediate 133 is obtained that includes hexagonal-prism-shaped cells arranged in a hexagonal close-packed lattice (see FIG. 15B).

Figures 16A, 16B:
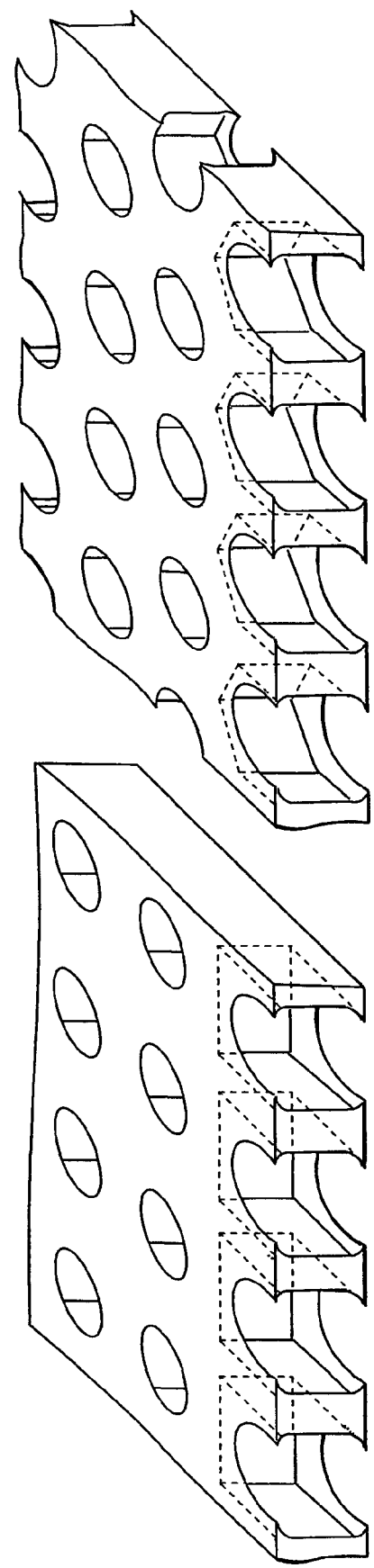
FIGS. 16A and 16B are diagrams each illustrating a hollow structure produced by the hollow structure manufacturing method of FIGS. 13A-13D.

A depth d of the cells of the intermediate 133 may be properly controlled by the vacuum level of the reduced pressure. Specifically, when in a high vacuum, the expansion of the air inside the cavities 131a is large, so that the depth d is great. When in a low vacuum, the expansion of the air inside the cavities 131a is small, so that the depth d is small. In the case where the vacuum level is further increased to increase the expansion of the air inside the cavities 131a, ceiling portions 133a of the intermediate 133 become thinner, eventually forming openings in the ceiling portions 133a. Thus, the hollow structure 133 is obtained that includes plural cells disposed in a plane, each having an opening in the upper wall and an opening in the lower wall (see FIGS. 16A and 16B). FIG. 16A shows the hollow structure 133 including square-prism-shaped cells arranged in a tetragonal lattice, and FIG. 16B shows the hollow structure 133 including hexagonal-prism-shaped cells arranged in a hexagonal close-packed lattice.

A depth d of the cells of the intermediate 133 may be properly controlled by the vacuum level of the reduced pressure. Specifically, when in a high vacuum, the expansion of the air inside the cavities 51a is large, so that the depth d is great. When in a low vacuum, the expansion of the air inside the cavities 51a is small, so that the depth d is small. In the case where the vacuum is further increased to increase the expansion of the air inside the cavities 131a, ceiling portions 133a of the intermediate 133 become thinner, eventually forming openings in the ceiling portions 133a. Thus, the hollow structure 133 is obtained that includes plural cells disposed in a plane, each having an opening in the upper wall and an opening in the lower wall (see FIGS. 16A and 16B). FIG. 16A shows the hollow structure 133 including square-prism-shaped cells arranged in a tetragonal lattice, and FIG.

16B shows the hollow structure 133 including hexagonal-prism-shaped cells arranged in a hexagonal close-packed lattice.

Examples of the substrate 131 may include a nickel substrate, a silicon substrate, a glass substrate with a resist pattern thereon, a copper clad board (copper/polyimide laminate substrate), an etched glass substrate, and a resin substrate made of polyimide, PTE, or acrylic resin. The cavities 131a of the substrate 131 are preferably subjected to hydrophobic treatment in order to prevent penetration of the solution containing the plastic material.

The thicknesses of the cell wall, the upper wall, and the lower wall, and the curvature radii of curved cross-sectional shapes of the joint portions of the upper and lower walls with the cell wall of the intermediate 133 can be controlled by the thickness and the material of the plastic film 132 and the reduced pressure condition (pressure level). The thinner the plastic film 132, the lower the thickness of the walls, and the lower the curvature radius of the joint portions. The lower the pressure, the greater the thickness of the walls, and the lower the curvature radius of the joint portions. The lower the viscosity of the plastic film 132, the lower the thickness of the walls, and the lower the curvature radius of the joint portions.

According to an embodiment of the present invention, the openings in the lower wall of the intermediate 133 may be formed by other than the above-described method, such as by mechanically partially removing the lower wall. If the intermediate 133 is soluble in water, the openings may be formed by dissolving the intermediate 133 in water. In the case of mechanically partially removing the lower wall, an adhesive tape is applied to the lower wall of the intermediate 133. Then the adhesive tape is removed to shear the lower wall, thereby forming the openings. In the case of dissolving the lower wall in water, water is deposited on the lower wall by dew condensation, steam, or spraying of water drops. Alternatively, water or the like diluted with a solvent such as ethanol may be deposited on the lower wall to cause the lower wall to shrink, thereby forming the openings. The openings are formed in the lower wall of the intermediate 133 by one of the above-described methods, so that the hollow structure 133 that may be used in the third embodiment of the present invention is obtained.

The cell wall, the upper wall, and the lower wall of the hollow structure (the intermediate) 133 are formed utilizing the surface tension of the plastic material. That is, it is possible to reduce the thickness of the walls of the hollow structure 133 compared to a hollow structure formed by microembossing or imagewise exposure. It is difficult to achieve the shape of the hollow structure (intermediate) 133 by using microembossing or imagewise exposure.

An image display device according to an embodiment of the present invention may include a display unit, the display unit including the display element of the third embodiment and a drive element for applying a voltage to the display element. The image display device may use the display element of the third element in which the openings in the wall not connected to the transparent conductive film are sealed with the drive element in place of an electrode or a resin. An image display system according to an embodiment of the present invention includes systems using the above-described image display device, such as an electronic book, an advertisement display system, a timetable system, and recycled paper.

A display device of the third embodiment of the present invention includes a hollow structure composite in which one of the walls of a hollow structure with openings is connected to a transparent conductive film. Such a hollow structure composite can be manufactured using a hollow structure composite manufacturing method according to an embodiment of the present invention.

According to an embodiment of the present invention, a hollow structure composite manufacturing method includes a step of forming a plastic first film on a surface of a substrate, in which plural independent cavities are formed, to enclose the cavities; a step of forming a second film on a surface, opposite to the surface at the side of the substrate, of the first film; a step of stretching the first film by expanding air in the cavities; and a step of bonding the first film and the second film together by curing the stretched first film. The first film preferably contains a light curing material such that the first film can be cured by light irradiation. The second film preferably transmits the light that cures the first film such that the first film can be cured by emitting light over the second film. The hollow structure composite formed on the substrate can be separated from the substrate for use.

According to another embodiment of the present invention, a hollow structure composite manufacturing method includes a step of forming a plastic first film on a surface of a substrate, in which plural independent cavities are formed, to enclose the cavities; a step of stretching the first film by expanding air in the cavities; a step of depositing a solvent, in which the first film is soluble or swellable, on a second film; a step of bringing the first film into contact with the solvent on the second film; and a step of bonding the first film and the second film together by removing the solvent. The hollow structure composite formed on the substrate can be separated from the substrate for use. The first and second films may be bonded together after partially removing the stretched first film and forming openings. In the case of partially removing the first film, the above-described mechanically removing method may be used for forming openings. If the first film is soluble in water, the above-described method of dissolving in water may be used for forming openings. The first film may be bonded to the second by being carried by a carrier after being separated from the substrate.

The hollow structure composite that can be manufactured in this way includes a hollow structure. The hollow structure includes plural cells disposed in a plane, each having a first opening and a second opening respectively in a first wall and a second wall, opposite to the first wall, of the hollow structure. One of the first wall with the first openings and the second wall with the second openings is connected to a predetermined member. The shape and the material of the member to which one of the first wall and the second wall is connected is not especially limited so long as the one of the first wall and the second wall can be connected to the member. The hollow structure composite may include fluid in the cells. The fluid is not especially limited so long as the fluid does not dissolve the hollow structure and the member connected to one of the first wall and the second wall.

Examples

Manufacture of Intermediate

An intermediate 133 was manufactured using the hollow structure manufacturing method of FIGS. 13A-13D. First, as a plastic material, an aqueous solution containing 5-30 wt % of gelatin MC-243 (Jellice Co., Ltd.) was applied onto a substrate 131 using a slit coater to form a plastic film 132. Then the substrate 131 with the plastic film 132 formed thereon was placed in a vacuum chamber, and the pressure in the vacuum chamber was reduced to expand the air inside the cavities. The residual moisture in gelatin was evaporated in a vacuum to completely dry and cure the plastic film 132.

Figure 17:
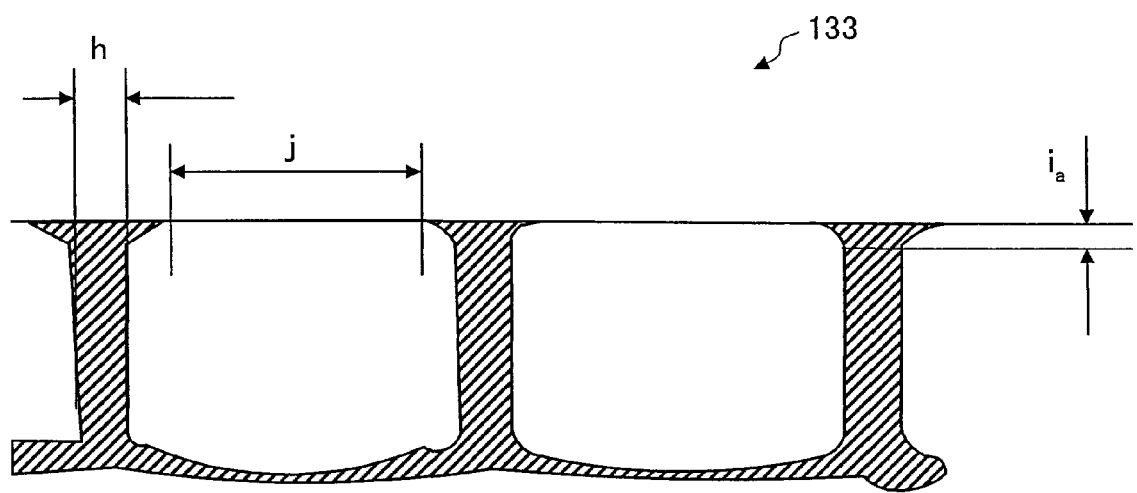
FIG. 17 is a cut-away side view showing an intermediate produced according to an embodiment of the present invention.

Thus the intermediate 133 (see FIG. 17) was obtained in which a thickness h of the cell wall was in the range from 0.01 to 5 μm; a thickness $i_a$ of the upper wall was in the range from 0.01 to 2 μm; a length j of a side of each opening was 140 μm; and a joint portion of the upper wall with the cell wall had a curved cross-sectional shape having a curvature radius in the range from 0.1 to 20 μm.

Example 5

Figure 18A:
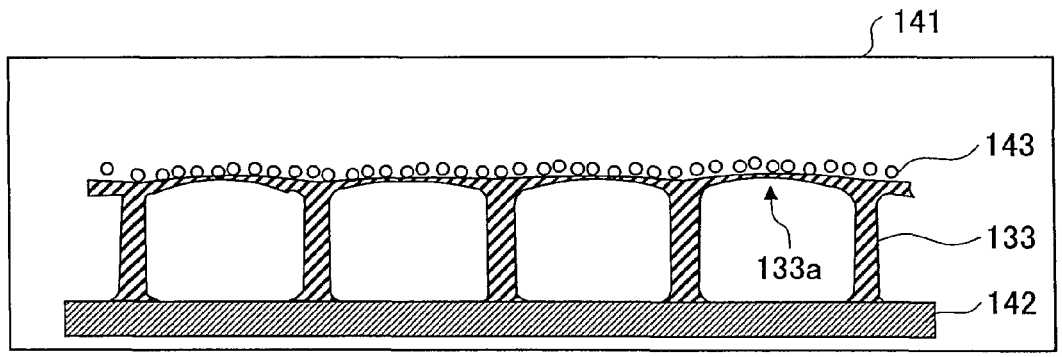
FIGS. 18A-18C are diagrams illustrating a method of manufacturing a hollow structure of Example 5.
Figure 18B:
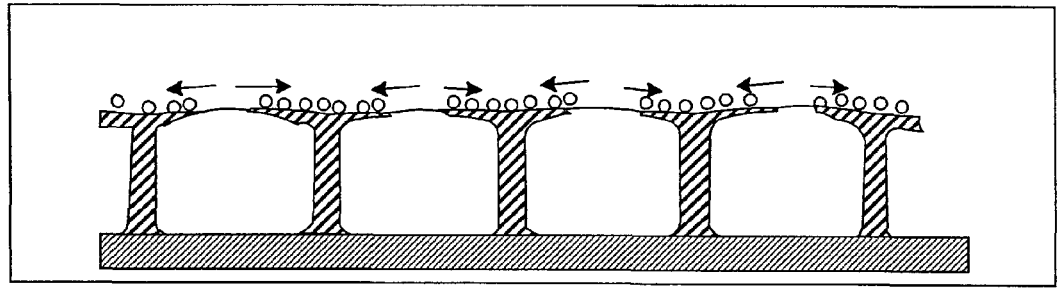
Figure 18C:
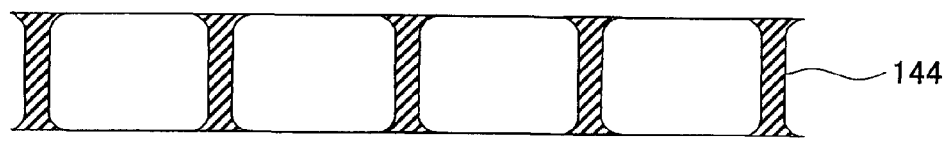

A sealing block 142 for sealing openings of an intermediate 133 was placed in a humidifying container 141 maintained at a temperature of 30° C. and a humidity in the range of 80-99%. Then an intermediate 133 was placed on the sealing block 142 in the humidifying container 141 (see FIG. 18A). The temperature of the intermediate 133 needs to be lower than that of the humidifying container 141. In this example, the temperature of the intermediate 133 was set to 20° C. Because the temperature had lower temperature than the humidifying container 141, water drops 143 were formed on the intermediate 133 as a result of dew condensation. It is to be noted that because the openings of the intermediate 133 are sealed, dew condensation does not occur inside the intermediate 133. Ceiling portions 133a of the intermediate 133 with dew condensation were dissolved in the water drops 143. Because the intermediate 133 is formed by being stretched by air pressure, gelatin molecules are aligned parallel to the horizontal direction, generating internal stress. The dissolution of the ceiling portions 133a resulted in loss of rigidity, which resulted in shrinkage due to surface tension, so that openings were formed (see FIG. 18B). Specifically, each opening was formed from the center of the ceiling portion 133a at which the thickness is smaller. Thus a hollow structure 144 (see FIG. 16) was formed (see FIG. 18C). When desired shapes of openings were formed by a predetermined time period of dew condensation, the hollow structure 144 was removed from the humidifying container 141 and was dried. In this way, the hollow structure 144 was obtained in which the thickness of the lower wall was in the range of 0.01-2 μm; and a joint portion of the lower wall with the cell wall had a curved cross-sectional shape of a curvature radius in the range of 0.1-20 μm.

The thinner the ceiling portions 133a of the intermediate, the less the time required for forming the openings. For example, when the thickness of the ceiling portions 133a was 0.05 μm, the time required for forming the openings was 20 seconds. The opening surface of the hollow structure 144 was smoother than that of Example 6 (described below).

Figure 19A:
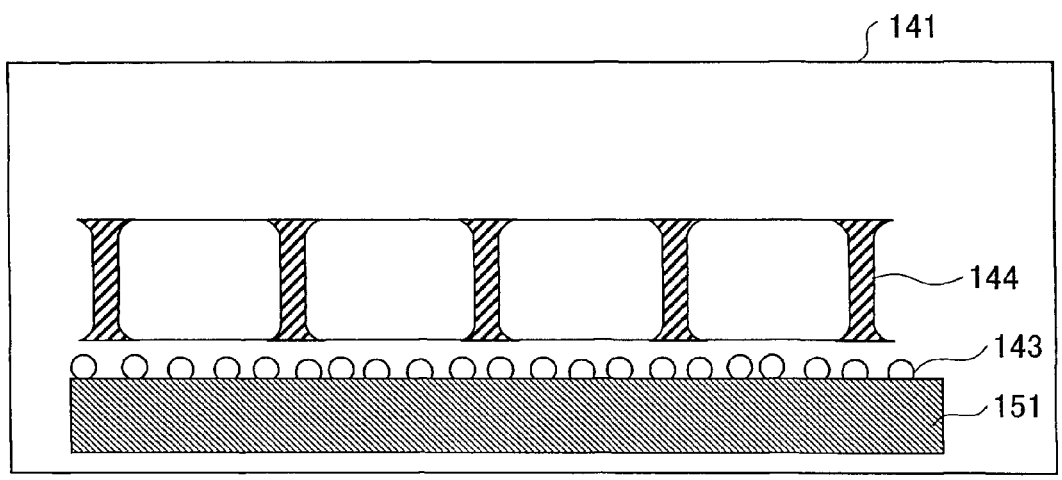
FIGS. 19A and 19B are diagrams illustrating a method of manufacturing a hollow structure composite of Example 5.
Figure 19B:
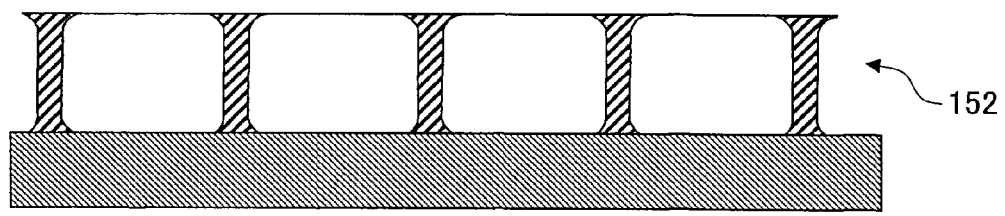

Then, a transparent-conductive-applied-film 151 of 20° C. was placed in the humidifying container 141 maintained at a temperature of 30° C. and a humidity in the range of 80-99%. When a suitable amount of water drops 143 were formed as a result of dew condensation, the hollow structure 144 was placed in the humidifying container 141 (see FIG. 19A). Because the temperature of the hollow structure 144 needs to be higher than that of the humidifying container 141 in order to prevent dew condensation thereon, the temperature of the hollow structure 144 was set to 50° C. The transparent-conductive-applied-film 151 includes a transparent PET film and a transparent ITO (Indium Tin Oxide) layer formed on the PET film by sputtering or other techniques. After one of the walls, each having openings, of the hollow structure 144 was brought into contact with the ITO layer of the transparent-conductive-applied-film 151, the hollow structure 144 with the transparent-conductive-applied-film 151 was removed from the humidifying container 141 and was dried. Thus a hollow structure composite 152 was obtained (see FIG. 19B). The hollow structure 144 and the transparent-conductive-applied-film 151 are connected to each other without interposing an adhesive layer therebetween, but the interfacial surfaces are in tight contact, resulting in substantially high bonding strength. It is to be noted that the transparent-conductive-applied-film 151 may be connected to either one of the two walls, each having openings, of the hollow structure 144.

Example 6

An adhesive tape was applied to ceiling portions 133a of an intermediate 133 (see FIG. 13C) formed on a substrate 131. Then the adhesive tape was removed to shear the ceiling portions 133a, so that openings were formed. Thus a hollow structure (see FIG. 16) was formed on the substrate 131. The hollow structure was then removed from the substrate 131. In this way, the hollow structure 144 was obtained in which the thickness of the lower wall was in the range of 0.01-2 μm; and a joint portion of the lower wall with the cell wall had a curved cross-sectional shape of a curvature radius in the range of 0.1-20 μm.

Then, in the same manner as in Example 5, the hollow structure was connected to a transparent-conductive-applied-film, so that a hollow structure composite was manufactured.

Example 7

Figure 20A:
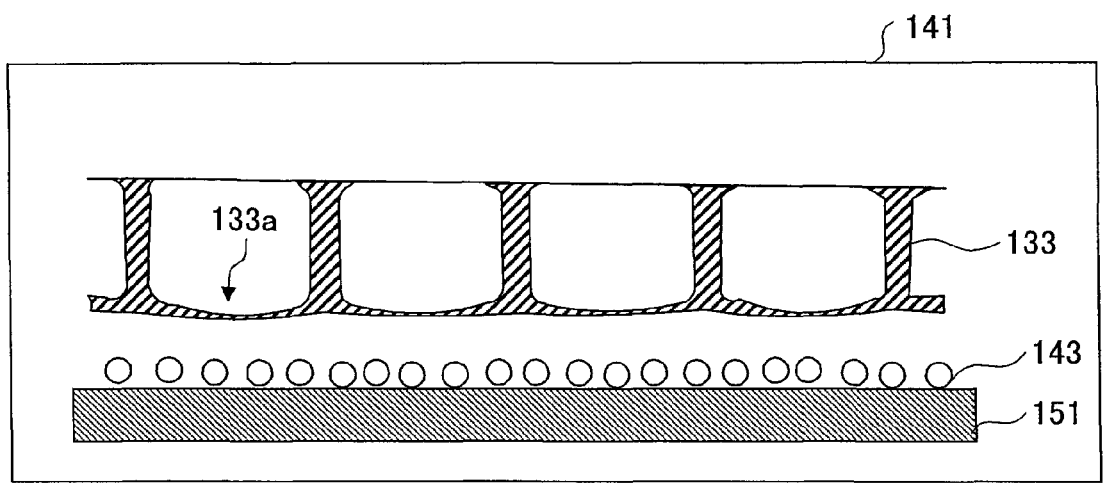
FIGS. 20A and 20B are diagrams illustrating a method of manufacturing a hollow structure composite of Example 7.
Figure 20B:
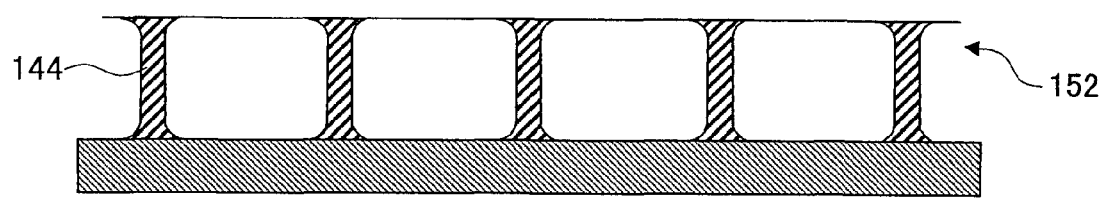

A transparent-conductive-applied-film 151 of 20° C. was placed in the humidifying container 141 maintained at a temperature of 30° C. and a humidity in the range of 80-99%. When a suitable amount of water drops 143 were formed as a result of dew condensation, an intermediate 133 was placed in the humidifying container 141 (see FIG. 20A). Because the temperature of the intermediate 133 needs to be higher than that of the humidifying container 141 in order to prevent dew condensation thereon, the temperature of the intermediate 133 was set to 50° C. After a wall of the hollow structure 133 not having openings was brought into contact with an ITO layer of the transparent-conductive-applied-film 151, the hollow structure 144 with the transparent-conductive-applied-film 151 was removed from the humidifying container 141 and was dried. Thus a hollow structure composite 152 was obtained (see FIG. 20B). Thus, the process of forming a hollow structure 144 (see FIG. 16) with openings in the upper wall and lower wall and the process of connecting the hollow structure 144 to the transparent-conductive-applied-film 151 could be performed at the same time. It was therefore possible to reduce the number of processing steps, facility cost, and cost for machining time. It is to be noted that when the intermediate 133 came into contact with the transparent-conductive-applied-film 151, openings were formed in the ceiling portions 133a of the intermediate 133 due to shrinkage in the same manner as in Example 5. In this way, the hollow structure composite 152 was obtained in which the thickness of the lower wall was in the range of 0.01-2 μm; and a joint portion of the lower wall with the cell wall had a curved cross-sectional shape of a curvature radius in the range of 0.1-20 μm.

Example 8

A hollow structure composite was manufactured using a part of the hollow structure manufacturing method of FIGS. 13A-13D. First, a fluorochemical surfactant Novec FC-4430

Figure 21A:
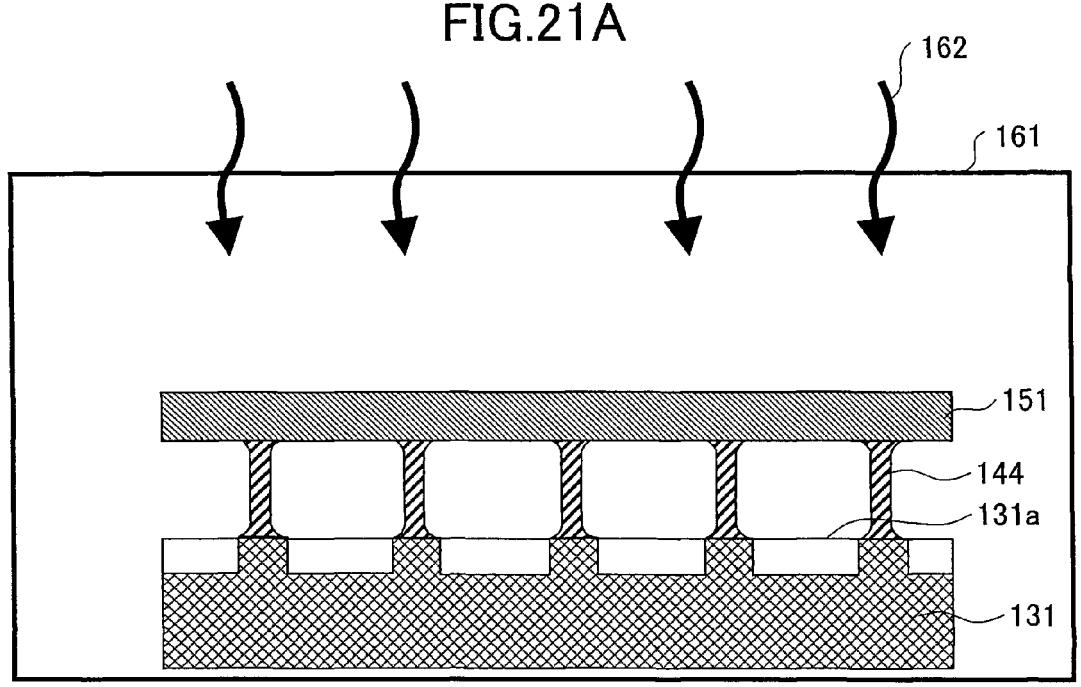
FIGS. 21A and 21B are diagrams illustrating a method of manufacturing a hollow structure composite of Example 8.

(3M Company) was added to an epoxy acrylate AQ9 (Arakawa Chemical Industries, Ltd.) for reducing the surface tension of the epoxy acrylate, thereby preparing a plastic material. Then, a solution containing the plastic material was applied onto a substrate 131, which includes plural independent cavities 131*a*, to form a plastic film 132. An ITO layer, i.e., an ultraviolet-transmitting-transparent-conductive-applied-film 151 is disposed on the plastic film 132. Then, the substrate 131 was placed in a pressure control system 161, and the pressure in the pressure control system 161 was reduced to expand the air inside the cavities 131*a*. When the vacuum level reached 50 kPa, ultraviolet rays were irradiated to cure the epoxy acrylate (see FIG. 21A). Thus, the process of forming a hollow structure 144 (see FIG. 16) with openings in the upper wall and lower wall and the process of connecting the hollow structure 144 to the transparent-conductive-applied-film 151 could be performed at the same time. It was therefore possible to reduce the number of processing steps, facility cost, and cost for machining time.

Figure 21B:
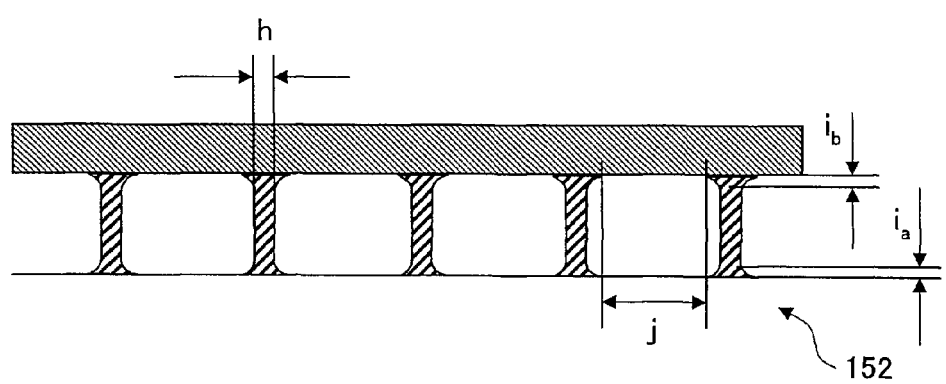

In this way, the hollow structure composite 152 (see FIG. 21B) was obtained in which a thickness h of the cell wall was in the range from 0.01 to 5 µm; a thickness $i_a$ of the upper wall and a thickness $i_b$ of the lower wall were in the range from 0.01 to 2 µm; a length j of a side of each opening was 140 µm; and joint portions of the upper and lower walls with the cell wall had curved cross-sectional shapes each having a curvature radius in the range from 0.1 to 5 µm.

Example 9

A hollow structure composite 152 was used that includes a hollow structure 144 (see FIG. 16B) and a transparent-conductive-applied-film 151 connected to the hollow structure 144. In the hollow structure 144, a thickness of the cell wall is 2 µm; a thickness $i_a$ of the upper wall and a thickness $i_b$ of the lower wall are 1 µm; a length j of a side of each opening is 140 µm; the depth of each cell is 50 µm; the cell-to-cell pitch is 150 µm; and joint portions of the upper and lower walls with the cell wall have curved cross-sectional shapes each having a 5 µm curvature radius. The transparent-conductive-applied-film 151 includes an ITO layer, which is a transparent common electrode, and a transparent PET film for transmitting images to be displayed and protecting an electrophoresis liquid 171.

Figure 22A:
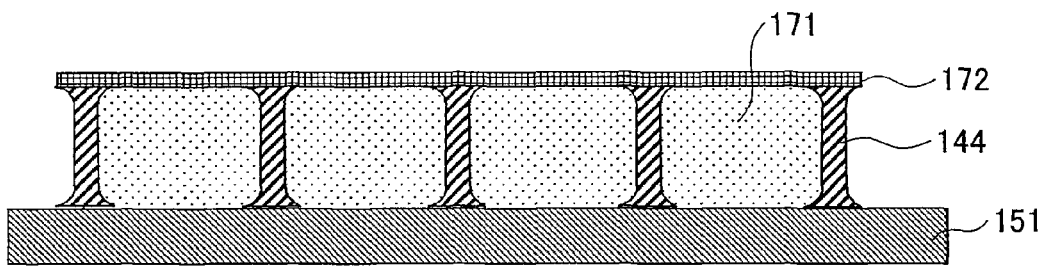
FIGS. 22A and 22B are diagrams illustrating a method of manufacturing a display element of Example 9.
Figure 22B:
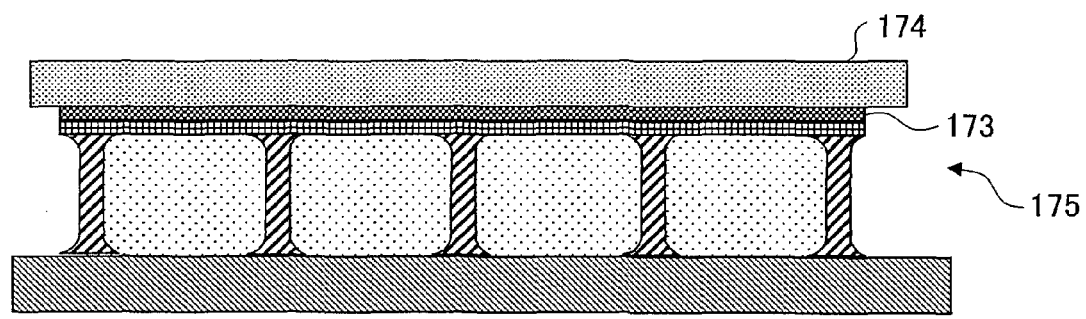

The electrophoresis liquid 171 containing colored particles, which move in response to image display signals (voltage, current, etc.), was injected into the cells in the hollow structure composite 152. Then, an aqueous solution containing gelatin MC-243 (Jellice Co., Ltd.) was applied onto the electrophoresis liquid 17*a* using a slit coater and was dried to form a sealing film 172 of a 5 µm thickness (see FIG. 22A). In place of gelatin, the openings may be sealed with a resin soluble in water but not soluble in an electrophoresis liquid 164, such as polyurethane, and polyvinyl alcohol. As a method of applying the solution, methods other than slit coating may be used such as spin coating and curtain coating. Then, an epoxy resin was applied onto the sealing film 172 using a slit coater to form an adhesive layer 173. After that, an electrode 174 was connected to the sealing film 172 through the adhesive layer 173. Thus a display element 175 was obtained (see FIG. 22B). As a material for forming the adhesive layer 173, materials other than epoxy resin may be used such as ultraviolet curing adhesive and hot-melt adhesive. As a method of applying the epoxy resin, methods other than slit coating may be used such as spin coating and curtain coating.

Example 10

Figure 23:
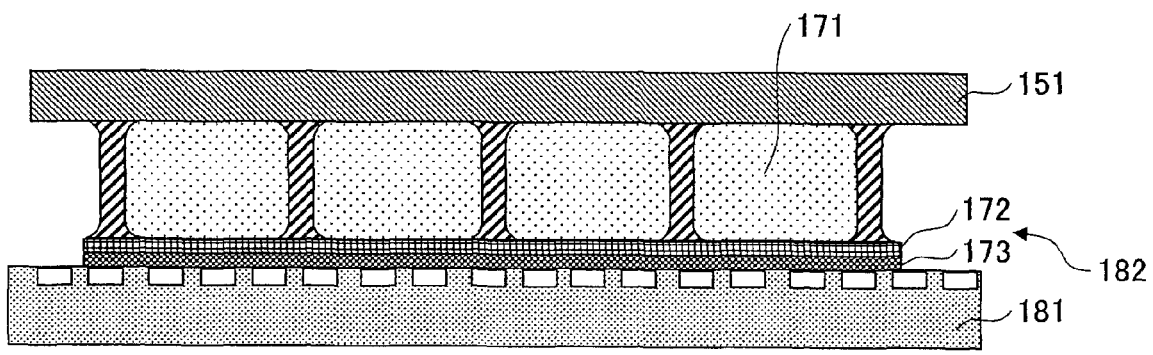
FIG. 23 is a cut-away side view showing an image display device of Example 10.

An image display device 182 (FIG. 23) was manufactured in the same manner as in Example 9 except that a voltage drive circuit 181 for sending image display signals to the display element was used in place of the electrode 174. A hollow structure composite 152 used was the hollow structure composite of Example 7.

A voltage of 10 V was applied from the voltage drive circuit 181 to the display element, and the white reflectance, the black reflectance, and the contrast were measured using an actinometer. The display properties obtained were a white reflectance of 42%, a black reflectance of 1%, and a contrast of 42, which are as good as those of below-described Reference Example 2. When the image display device 182 was bent to a curvature of 200 mm, fracture of the hollow structure 144 and separation of the transparent-conductive-applied-film 151 did not occur.

Example 11

An image display device was manufactured in the same manner as in Example 10 except that the hollow structure composite of Example 8 was used.

A voltage of 10 V was applied from the voltage drive circuit 181 to the display element, and the white reflectance, the black reflectance, and the contrast were measured using an actinometer. The display properties obtained were a white reflectance of 42%, a black reflectance of 1%, and a contrast of 42, which are as good as those of below-described Reference Example 2. When the image display device was bent to a curvature of 200 mm, fracture of the hollow structure 144 and separation of the transparent-conductive-applied-film 151 did not occur.

Example 12

A hollow structure composite 152 was used that includes a hollow structure 144 (see FIG. 16B) and a transparent-conductive-applied-film 151 connected to the hollow structure 144. In the hollow structure 144, a thickness of the cell wall is 2 µm; a thickness $i_a$ of the upper wall and a thickness $i_b$ of the lower wall are 1 µm; a length j of a side of each opening is 140 µm; the depth of each cell is 50 µm; the cell-to-cell pitch is 150 µm; and joint portions of the upper and lower walls with the cell wall have curved cross-sectional shapes each having a 5 µm curvature radius. The transparent-conductive-applied-film 151 includes an ITO layer, which is a transparent common electrode, and a transparent PET film for transmitting images to be displayed and protecting an electrophoresis liquid 171.

Figure 24A:
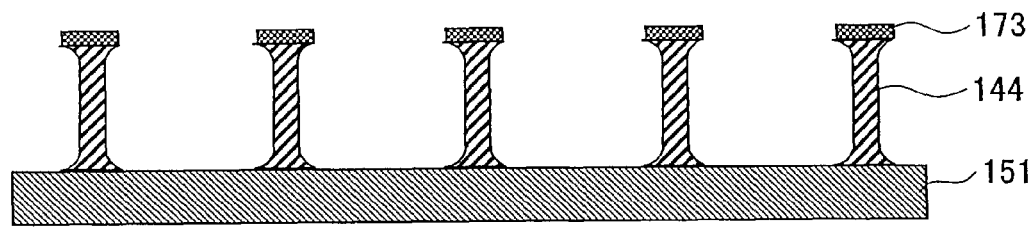
FIGS. 24A thorough 24C are diagrams illustrating a method of manufacturing a display element of Example 12.
Figure 24B:
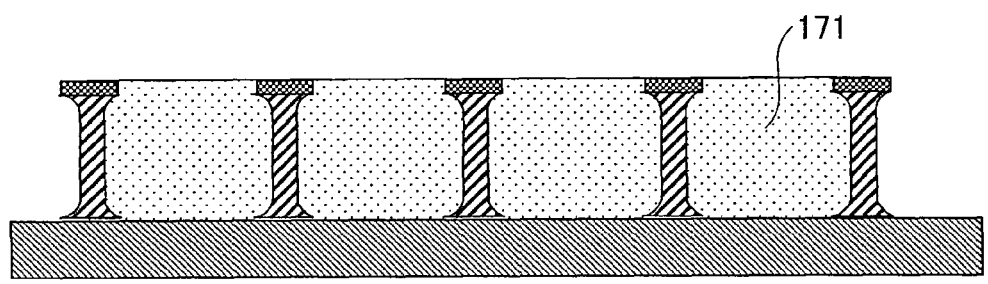
Figure 24C:
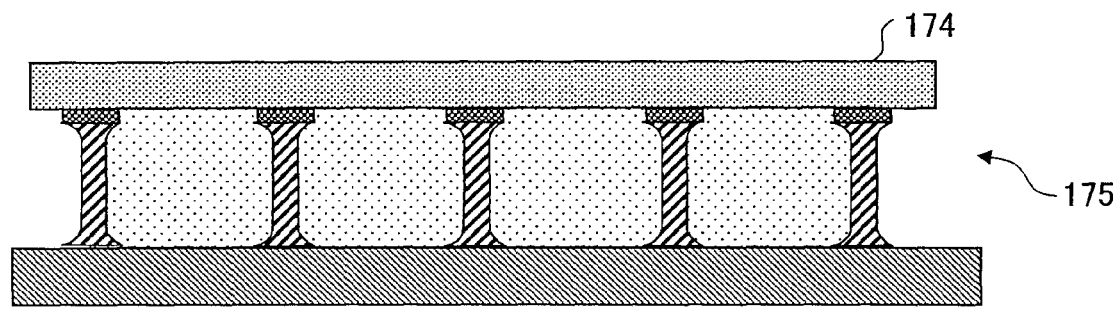

An epoxy resin was applied onto the upper wall of the hollow structure composite 152 using a slit coater to form an adhesive layer 173 (see FIG. 24A). Then, an electrophoresis liquid 171 containing colored particles, which move in response to image display signals (voltage, current, etc.), was injected into the cells (see FIG. 24B). As a material for forming the adhesive layer 173, materials other than epoxy resin may be used such as ultraviolet curing adhesive and hot-melt adhesive. As a method of applying the epoxy resin, methods other than slit coating may be used such as spin coating and curtain coating. Then, an electrode 174 was bonded to the hollow structure 144 through the adhesive layer 173. Thus a display element 175 was obtained (FIG. 24C).

Example 13

Figure 25:
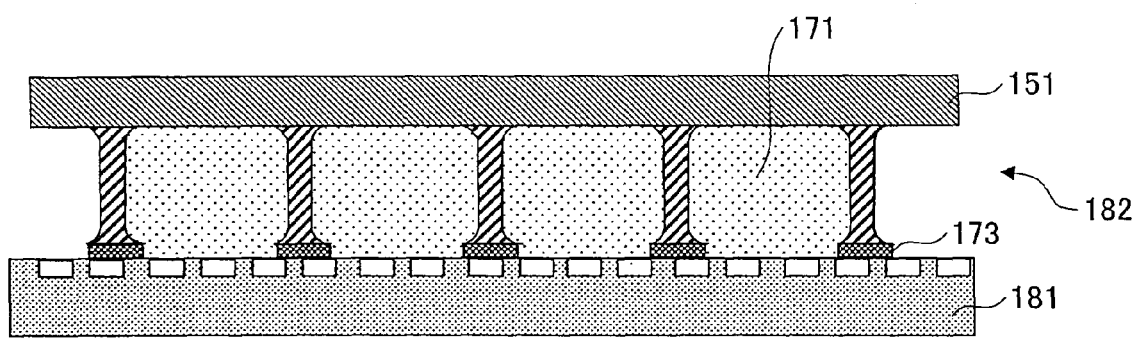
FIG. 25 is a cut-away side view showing an image display device of Example 13.

An image display device 182 (FIG. 25) was manufactured in the same manner as in Example 9 except that a voltage drive circuit 181 for sending image display signals to the display element was used in place of the electrode 174 (see FIG. 25). A hollow structure composite 152 used was the hollow structure composite of Example 7.

A voltage of 10 V was applied from the voltage drive circuit 181 to the display element, and the white reflectance, the black reflectance, and the contrast were measured using an actinometer. The display properties obtained were a white reflectance of 42%, a black reflectance of 1%, and a contrast of 42, which are as good as those of below-described Reference Example 2. When the image display device 182 was bent to a curvature of 200 mm, fracture of the hollow structure 144 and separation of the transparent-conductive-applied-film 151 did not occur.

Reference Example 2

An image display device was manufactured in the same manner as in Example 10 except that a hollow structure including cells of 10 mm by 10 mm in width and length and 50 mm in depth was used in place of the hollow structure 144.

A voltage of 10 V was applied from the voltage drive circuit 181 to the display element, and the white reflectance, the black reflectance, and the contrast were measured using an actinometer. The display properties obtained were a white reflectance of 43%, a black reflectance of 1%, and a contrast of 43.

The present application is based on Japanese Priority Applications No. 2007-059114 and No. 2007-059115, both filed on Mar. 8, 2007, with the Japanese Patent Office, the entire contents of which are hereby incorporated by reference.

The invention claimed is:

1. A display element comprising:
a hollow structure including plural cells disposed in a plane, each having an opening in a first wall of the hollow structure; and a partition wall separating the adjacent cells;
a solvent disposed in the cells, the solvent having one or more types of white particles and/or colored particles dispersed therein;
wherein the openings are sealed with a resin insoluble in the solvent;
wherein a thickness of the partition wall separating the adjacent cells is 0.01 µm or greater but not greater than 10 µm; and
wherein a first joint portion of the first wall with the partition wall and a second joint portion of a second wall with the partition wall have curved cross-sectional shapes, a curvature radius of each of which is 0.1 µm or greater but not greater than 50 µm.

2. The display element as claimed in claim 1, wherein a thickness of the first wall and/or a second wall, opposite to the first wall, is 0.01 µm or greater but not greater than 10 µm.

3. A display element comprising:
a hollow structure including plural cells disposed in a plane, each having an opening in a first wall of the hollow structure; and a partition wall separating the adjacent cells;
a solvent disposed in the cells, the solvent having one or more types of white particles and/or colored particles dispersed therein;
wherein the openings are sealed with a resin insoluble in the solvent; and
wherein a first joint portion of the first wall with the partition wall and a second joint portion of a second wall, opposite to the first wall, with the partition wall have curved cross-sectional shapes, a curvature radius of each of which is 0.1 µm or greater but not greater than 50 µm.

4. The display element as claimed in claim 3, wherein the hollow structure is made of a material obtained by drying a plastic material.

5. The display element as claimed in claim 4, wherein the plastic material contains a water-soluble resin.

6. The display element as claimed in claim 3, wherein the hollow structure is made of a material obtained by curing a plastic material by ultraviolet irradiation.

7. An image display device comprising:
the display element of claim 1; and
a unit that applies a voltage to the display element.

8. The display element as claimed in claim 3, wherein the hollow structure is made of a material obtained by drying a plastic material.

9. The display element as claimed in claim 8, wherein the plastic material contains a water-soluble resin.

10. The display element as claimed in claim 3, wherein the hollow structure is made of a material obtained by curing a plastic material by ultraviolet irradiation.

11. An image display device comprising:
the display element of claim 3; and
a unit that applies a voltage to the display element.

12. A display element comprising:
a hollow structure including plural cells disposed in a plane, each having an opening in a first wall of the hollow structure; and a partition wall separating the adjacent cells;
a solvent disposed in the cells, the solvent having one or more types of white particles and/or colored particles dispersed therein;
wherein the openings are sealed with a resin insoluble in the solvent;
wherein the resin is a film, a thickness of which is 0.1 µm or greater but not greater than 10 µm; and
wherein a first joint portion of the first wall with the partition wall and a second joint portion of a second wall with the partition wall have curved cross-sectional shapes, a curvature radius of each of which is 0.1 µm or greater but not greater than 50 µm.

13. The display element as claimed in claim 12, wherein the hollow structure is made of a material obtained by drying a plastic material.

14. The display element as claimed in claim 13, wherein the plastic material contains a water-soluble resin.

15. The display element as claimed in claim 12, wherein the hollow structure is made of a material obtained by curing a plastic material by ultraviolet irradiation.

16. An image display device comprising:
the display element of claim 12; and
a unit that applies a voltage to the display element.

17. The display element as claimed in claim 1, wherein at least two of the cells are different in size.

18. The display element as claimed in claim 1, wherein at least two of the cells are different in shape.

19. The display element as claimed in claim 3, wherein at least two of the cells are different in size.

20. The display element as claimed in claim 3, wherein at least two of the cells are different in shape.

* * * * *